(12) United States Patent
Zhang et al.

(10) Patent No.: US 12,408,068 B2
(45) Date of Patent: Sep. 2, 2025

(54) ADAPTING A RADAR TRANSMISSION BASED ON A CONGESTION LEVEL

(71) Applicant: QUALCOMM Incorporated, San Diego, CA (US)

(72) Inventors: Dan Zhang, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 17/476,448

(22) Filed: Sep. 15, 2021

(65) Prior Publication Data

US 2022/0095151 A1    Mar. 24, 2022

Related U.S. Application Data

(60) Provisional application No. 63/081,837, filed on Sep. 22, 2020.

(51) Int. Cl.
*H04W 28/02* (2009.01)
*H04W 16/28* (2009.01)

(52) U.S. Cl.
CPC ....... *H04W 28/0226* (2013.01); *H04W 16/28* (2013.01); *H04W 28/0289* (2013.01)

(58) Field of Classification Search
CPC ............. H04W 28/0226; H04W 16/28; H04W 28/0289; G01S 7/0236; G01S 13/343; G01S 13/345; G01S 13/931; G01S 7/023
See application file for complete search history.

(56) References Cited

U.S. PATENT DOCUMENTS

| | | | |
|---|---|---|---|
| 10,605,911 B1 * | 3/2020 | Parker | G01S 13/42 |
| 10,779,189 B2 * | 9/2020 | Khoryaev | H04L 47/283 |
| 2017/0019923 A1 * | 1/2017 | Agardh | H04W 74/0808 |
| 2017/0293016 A1 * | 10/2017 | McCloskey | G01S 13/08 |
| 2019/0103663 A1 * | 4/2019 | Ichinose | H01Q 21/0037 |
| 2019/0195985 A1 * | 6/2019 | Lin | G01S 13/931 |
| 2019/0324136 A1 * | 10/2019 | Amadjikpe | G01S 13/70 |
| 2020/0025866 A1 | 1/2020 | Gulati et al. | |
| 2020/0185804 A1 * | 6/2020 | Watanabe | G01S 13/584 |
| 2022/0082681 A1 * | 3/2022 | Rao | G01S 7/352 |
| 2022/0365169 A1 * | 11/2022 | Lefevre | G01S 7/0235 |

OTHER PUBLICATIONS

International Search Report and Written Opinion—PCT/US2021/050722—ISA/EPO—Jan. 10, 2022.

* cited by examiner

*Primary Examiner* — Siming Liu
(74) *Attorney, Agent, or Firm* — Procopio, Cory, Hargreaves & Savitch LLP/QUALCOMM Incorporated

(57) ABSTRACT

This disclosure provides systems, devices, apparatus, and methods, including computer programs encoded on storage media, for adapting a radar transmission based on a congestion level. A wireless device, such as a radar device, a UE, a base station, a vehicle, etc., may detect a congestion level of a wireless communication environment that includes the wireless device. The wireless device may have at least one of a first FOV or a first range within the wireless communication environment. The wireless device may transmit, based on the congestion level exceeding a threshold, a radar signal that corresponds to the wireless device having at least one of a second FOV or a second range in the wireless communication environment that is smaller than the at least one of the first FOV or the first range.

29 Claims, 12 Drawing Sheets

ADAPTING A RADAR TRANSMISSION BASED ON A CONGESTION LEVEL

CROSS REFERENCE TO RELATED APPLICATION(S)

This application claims the benefit of and priority to U.S. Provisional Application Ser. No. 63/081,837, entitled "Adapting a Radar Transmission based on a Congestion Level" and filed on Sep. 22, 2020, which is expressly incorporated by reference herein in its entirety.

INTRODUCTION

The present disclosure relates generally to radar devices, and more particularly, to adjusting a radar transmission.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a wireless device is provided. The method may include detecting a congestion level of a wireless communication environment that includes the wireless device, the wireless device having at least one of a first field of view (FOV) or a first range within the wireless communication environment; and transmitting, based on the congestion level exceeding a threshold, a radar signal that corresponds to the wireless device having at least one of a second FOV or a second range in the wireless communication environment that is smaller than the at least one of the first FOV or the first range.

In another aspect of the disclosure, an apparatus for wireless communication at a wireless device is provided. The apparatus includes a memory and at least one processor coupled to the memory, the memory and the at least one processor configured to detect a congestion level of a wireless communication environment that includes the wireless device, the wireless device having at least one of a first FOV or a first range within the wireless communication environment; and transmit, based on the congestion level exceeding a threshold, a radar signal that corresponds to the wireless device having at least one of a second FOV or a second range in the wireless communication environment that is smaller than the at least one of the first FOV or the first range.

In another aspect of the disclosure, an apparatus for wireless communication at a wireless device is provided. The apparatus may include means for detecting a congestion level of a wireless communication environment that includes the wireless device, the wireless device having at least one of a first FOV or a first range within the wireless communication environment; and means for transmitting, based on the congestion level exceeding a threshold, a radar signal that corresponds to the wireless device having at least one of a second FOV or a second range in the wireless communication environment that is smaller than the at least one of the first FOV or the first range.

In another aspect of the disclosure, a computer-readable medium storing computer executable code for wireless communication at a wireless device is provided. The computer-readable medium may be non-transitory, for example. The code when executed by a processor causes the processor to detect a congestion level of a wireless communication environment that includes the wireless device, the wireless device having at least one of a first FOV or a first range within the wireless communication environment; and transmit, based on the congestion level exceeding a threshold, a radar signal that corresponds to the wireless device having at least one of a second FOV or a second range in the wireless communication environment that is smaller than the at least one of the first FOV or the first range.

In an aspect of the disclosure, a method of wireless communication at a wireless device is provided. The method may include measuring a congestion level of a wireless communication environment that includes a first wireless device, the first wireless device having at least one of a first FOV or a first range within the wireless communication environment; and transmitting a message to the first wireless device based on the congestion level, the message associated with the first wireless device having at least one of a second FOV or a second range in the wireless communication environment that is smaller than the at least one of the first FOV or the first range.

In another aspect of the disclosure, an apparatus for wireless communication at a wireless device is provided. The apparatus includes a memory and at least one processor coupled to the memory, the memory and the at least one processor configured to measure a congestion level of a wireless communication environment that includes a first wireless device, the first wireless device having at least one of a first FOV or a first range within the wireless communication environment; and transmit a message to the first wireless device based on the congestion level, the message associated with the first wireless device having at least one of a second FOV or a second range in the wireless communication environment that is smaller than the at least one of the first FOV or the first range.

In another aspect of the disclosure, an apparatus for wireless communication at a wireless device is provided. The apparatus may include means for measuring a congestion level of a wireless communication environment that includes a first wireless device, the first wireless device having at least one of a first FOV or a first range within the wireless communication environment; and means for transmitting a message to the first wireless device based on the congestion level, the message associated with the first wireless device having at least one of a second FOV or a second range in the wireless communication environment that is smaller than the at least one of the first FOV or the first range.

In another aspect of the disclosure, a computer-readable medium storing computer executable code for wireless communication at a wireless device is provided. The computer-readable medium may be non-transitory, for example. The code when executed by a processor causes the processor to measure a congestion level of a wireless communication environment that includes a first wireless device, the first wireless device having at least one of a first FOV or a first range within the wireless communication environment; and transmit a message to the first wireless device based on the congestion level, the message associated with the first wireless device having at least one of a second FOV or a second range in the wireless communication environment that is smaller than the at least one of the first FOV or the first range.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
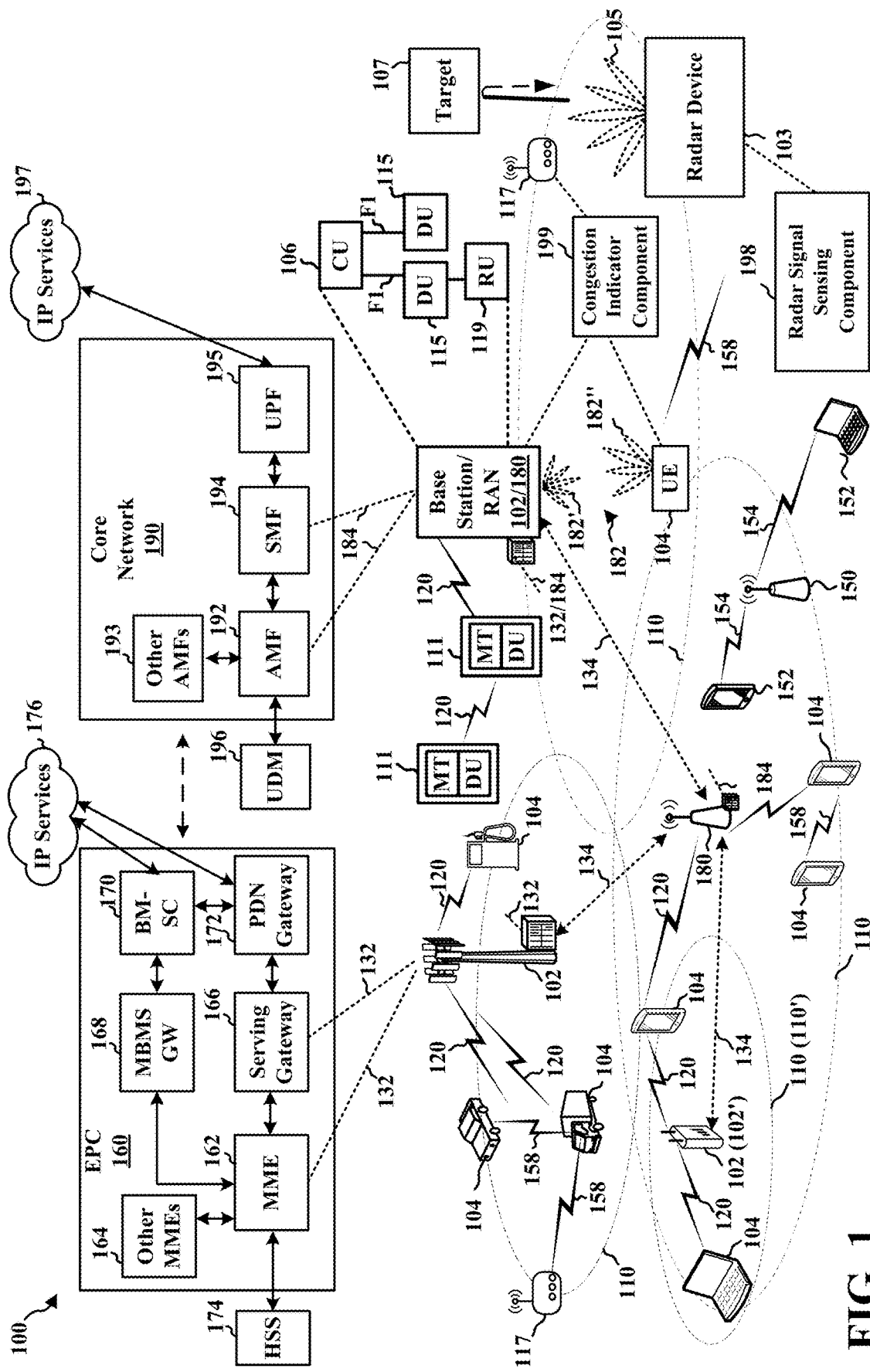
FIG. 1 is a diagram illustrating an example of a radar device and a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

A ranging radar may be incorporated in or on equipment for performing collision avoidance and other related sensing techniques. As one example, a ranging radar may be provided at a vehicle, industrial equipment, environment sensing equipment, etc. The radar may be configured to transmit a radar signal/pulse and receive a return signal based on a reflection of the radar signal from an object/target. A radar device may determine a time delay between transmission of the radar signal and the reception of the return signal in order to calculate a distance between the radar device and one or more physical objects from which the return signal is reflected. In some aspects, a physical object from which a radar signal is reflected may be referred to as a target. In some cases, the radar device may detect a false target, or may falsely detect a location of a target, based on a received signal that is not an accurate reflection of the radar signal from a target. Such interference may interfere with the radar signal and may at least partially occlude the target from accurate detection by the radar device. For example, with the radar device may receive a signal, which is not a reflection of the radar device's own signal, with a shortened distance/time offset and with increased power in comparison to an actual reflection of the radar signal. If the radar device assumes that the signal is a reflection of the radar device's own signal, it will falsely detect a target. A false target may refer to an inaccurate detection of a target by the radar device.

In some examples, multiple devices in an area may operate ranging radars or may transmit other sensing signals. As an example, other sensing devices may perform a similar detection of objects based on a transmission and reflection of a type of signal similar to a radar signal. The other sensing devices may use a signal that is at least somewhat different than a radar signal. The transmission of multiple radar signals, or other signals from other sensing devices, near a radar device may lead to increasing interference to accurate radar detection at the radar device. Each sensing device or radar device may transmit signals independently, e.g., without coordinated control. The radar device may receive the return signal (e.g., reflected signal) based on the radar device's own signal and/or may receive a different signal as interference transmitted from a different radar device or a different sensing device. The reception of an interfering signal may lead to inaccurate radar detection at the radar device. For example, when multiple radar sources operate within a particular range of the radar device, the other radar sources may cause interference to the reception and object determination of the radar device.

Aspects presented herein provide for a radar device to adjust radar transmission or detection parameters based on a current congestion level. In one or more aspects, the radar/equipment may determine a congestion level based on a content and a number of messages received by the radar (e.g., via a Uu link or a sidelink) or based on interference that the radar device determines from a false peak or an increased noise floor on a range spectrum associated with a radar image at the radar device. "Congestion" refers to interference to/from a radar device caused by one or more other radar signals in a wireless communication environment. "Congestion level" refers to an amount of the one or more stray radar signals that are generating the interference in the wireless communication environment. In one example, the radar may determine the congestion level within a range of the radar based on a number of detected devices and/or an amount of signals detected by radar. The range may refer to an area surrounding the radar or a distance from the radar. According to one or more aspects, if the congestion level exceeds a threshold, the radar may reduce the maximum detection range of the radar by decreasing a sweeping up time ($T_{up}$) and providing a larger discontinuous transmission (DTX) time between radar pulses.

In one example, the radar device may reduce the transmit power to reduce a maximum detection range of the radar. By decreasing the maximum detection range of the radar, detection of closer objects may be prioritized without impacting the radar device's detection of a speed and/or a direction of the closer objects. In one example, the range of the radar may be reduced to reduce interference to the radar. Decreasing the range of the radar may also cause the radar to generate less interference to other devices within the wireless communication environment (e.g., other devices within proximity to the radar). While objects that have a larger physical distance may still be detected in some cases, the radar device may be configured to reduce a priority, or de-prioritize, detection of more distant objects as the congestion level of radar signals in the current environment increases. For example, the radar device may prioritize the detection of objects that are closer (e.g., have a closer physical distance) to the radar device as the congestion level increases. The adjustment of a radar signal, e.g., to reduce a transmit power and/or reduce a detection range, based on a congestion level in a surrounding area enables the radar device to reduce interference that may be caused to other nearby devices. As the adjustment is based on a congestion level, the transmission power and/or detection range may be increased when there are lower congestion levels and lower likelihood of interference.

FIG. 1 is a diagram 100 illustrating an example of a wireless communications system and an access network in which base stations 102 or 180 may wirelessly communicate with user equipments (UEs) 104, such as a roadside unit (RSU) 117 or other device that may transmit/receive sidelink communications. Some wireless devices may perform radar signal sensing. For example, a radar device 103 may transmit a wireless signal 105 and use information about the signal to image an environment or determine information about a target 107 based on range, Doppler, and/or angle information determined from the wireless signal. The signal may include a defined waveform, such as a frequency modulated continuous wave (FMCW), a pulse waveform, or a chirp waveform, among other examples of a defined waveform.

Figure 7A:
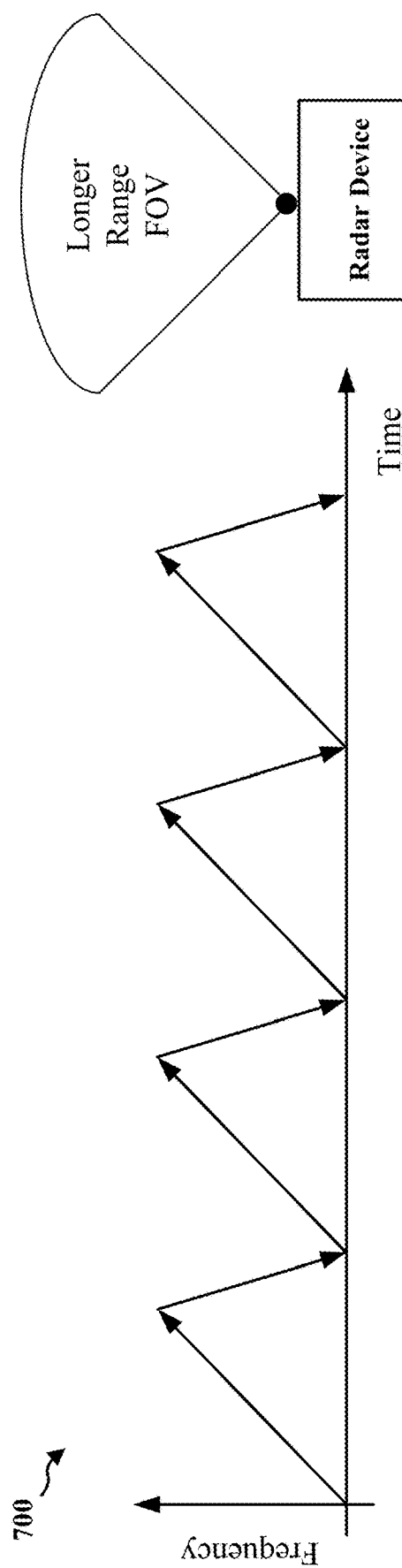
FIGS. 7A-7B illustrate example diagrams corresponding to different ranges for a field of view of a radar.
Figure 7B:
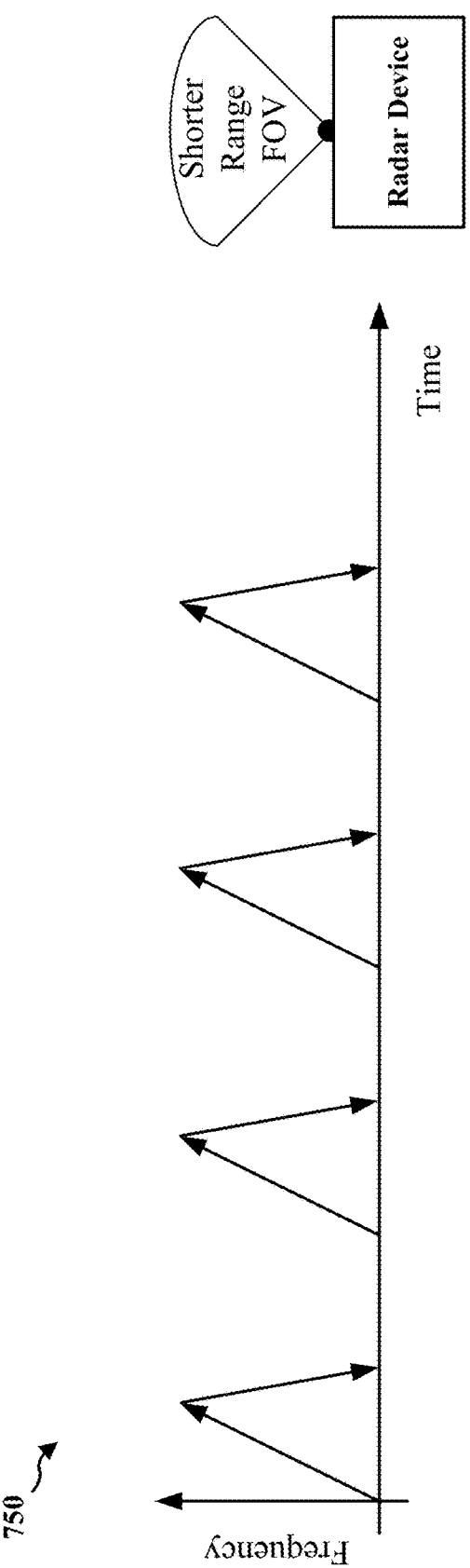

In some examples, the radar device 103 may transmit a radar signal to determine information about a target or an environment. A radar signal sensing component 198 in the radar device 103 may transmit the radar signal. The radar signal sensing component 198 may be configured to detect a congestion level of a wireless communication environment that includes the wireless device, the wireless device having at least one of a first field of view (FOV) or a first range within the wireless communication environment; and transmit, based on the congestion level exceeding a threshold, a radar signal that corresponds to the wireless device having at least one of a second FOV or a second range in the wireless communication environment that is smaller than the at least one of the first FOV or the first range. FIGS. 7A and 7B illustrate example aspects of transmission of a radar signal associated with different FOVs. In certain aspects, a UE 104 may include a congestion indicator component 199 configured to measure a congestion level of a wireless communication environment that includes a first wireless device, the first wireless device having at least one of a first FOV or a first range within the wireless communication environment; and transmit a message to the first wireless device based on the congestion level, the message associated with the first wireless device having at least one of a second FOV or a second range in the wireless communication environment that is smaller than the at least one of the first FOV or the first range.

The radar device 103 may compare the received signal to the transmitted signal to determine information about the target 107 or environment. Radar signal sensing may be employed for automotive radar, e.g., detecting an environment around a vehicle, nearby vehicles or items, detecting information for smart cruise control, collision avoidance, etc. Radar signal sensing may be employed for gesture recognition, e.g., a human activity recognition, a hand motion recognition, a facial expression recognition, a keystroke detection, sign language detection, etc. Radar signal sensing may be employed to acquire contextual information, e.g., location detection, tracking, determining directions, range estimation, etc. Radar signal sensing may be employed to image an environment, e.g., to provide a 3-dimensional (3D) map for virtual reality (VR) applications. Radar devices may be employed to provide high resolution localization, e.g., for industrial Internet-of-things (IIoT) applications. In some examples, the radar device 103 may provide consumer level radar with advanced detection capabilities. Radar signal sensing may provide touchless or device free interaction with a device or system. For example, a wireless device may detect user gestures to trigger an operation at the wireless device.

In some examples, radar signal sensing may be based on frequency ranges that overlap with wireless communication systems for the signal 105, such as the wireless communication system illustrated in FIG. 1. The radar device 103 may use a waveform for the signal 105 that relates to a communication system. As one non-limiting example, radar signal sensing may be based on a signal in a mmW frequency range, such as a Frequency Range2 (FR2), Frequency Range 2x (FR2x), and/or Frequency Range 4 (FR4) signal, which may provide improved range for radar signal detection. In some examples, the radar device 103 may have the capability to perform radar signal sensing and wireless communication. In some examples, the radar device 103 may be a component of a UE 104, a base station 102 or 180, or other access point in the communication system of FIG. 1. In some examples, the radar device 103 may be a wireless communication device (e.g., a UE 104, base station 102/180, or other access point) that supports radar transmission and detection. In other examples, the radar device 103 may perform radar signal transmission and sensing without having wireless communication capabilities. As illustrated in FIG. 1, the radar device 103 may use directional beams to transmit the radar signal 105. For example, the radar device 103 may transmit the radar signal in a particular direction relative to the radar device. The radar device 103 may be within or outside of a coverage area 110 of a base station 102 or 180.

The wireless communications system illustrated in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 115, and/or one or more remote units (RU) 119, as illustrated in FIG. 1. A RAN may be disaggregated with a split between an RU 119 and an aggregated CU/DU. A RAN may be disaggregated with a split between the CU 106, the DU 115, and the RU 119. A RAN may be disaggregated with a split between the CU 106 and an aggregated DU/RU. The CU 106 and the one or more DUs 115 may be connected via an F1 interface. A DU 115 and an RU 119 may be connected via a fronthaul interface. A connection between the CU 106 and a DU 115 may be referred to as a midhaul, and a connection between a DU 115 and an RU 119 may be referred to as a fronthaul. The connection between the CU 106 and the core network may be referred to as the backhaul. The RAN may be based on a functional split between various components of the RAN, e.g., between the CU 106, the DU 115, or the RU 119. The CU 106 may be configured to perform one or more aspects of a wireless communication protocol, e.g., handling one or more layers of a protocol stack, and the DU(s) 115 may be configured to handle other aspects of the wireless communication protocol, e.g., other layers of the protocol stack. In different implementations, the split between the layers handled by the CU 106 and the layers handled by the DU 115 may occur at different layers of a protocol stack. As one, non-limiting example, a DU 115 may provide a logical node to host a radio link control (RLC) layer, a medium access control (MAC) layer, and at least a portion of a physical (PHY) layer based on the functional split. An RU 119 may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 115. IAB nodes 111 may include a DU 115 and a mobile termination (MT). The DU 115 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as an RSU 117), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as the RSU 117, etc. Sidelink communication may be exchanged using a PC5 interface, in some examples.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
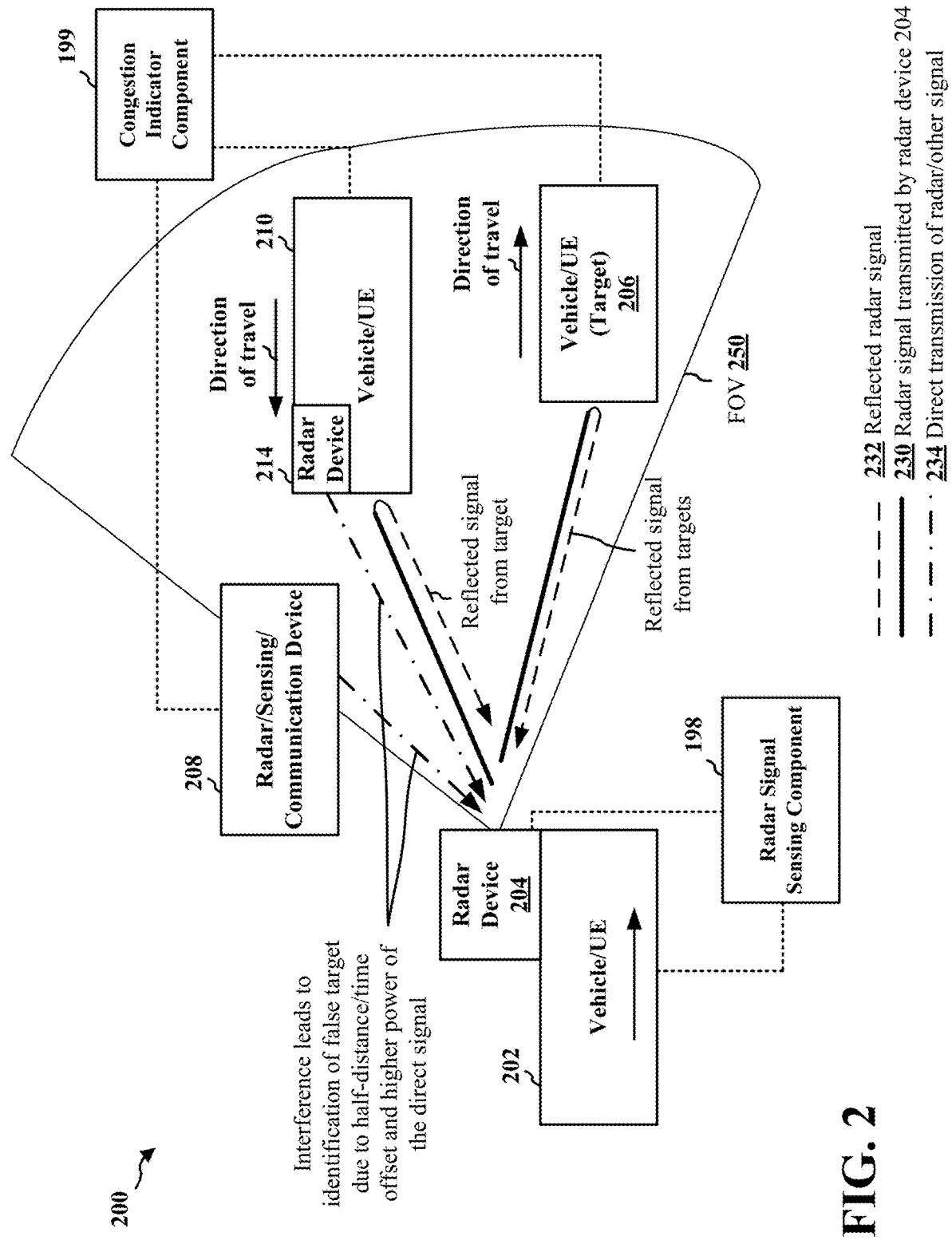
FIG. 2 is a diagram illustrating radar signals transmitted by a vehicle and reflected from a target and a false target.

FIG. 2 is a diagram 200 illustrating radar signals transmitted by a radar device 204 associated with a vehicle 202 and reflected from a target 206 or vehicle 210 and signals that lead to a detection of a false target, which may also be referred to as a false detection of a target, at the radar device 204. The radar device 204 may be a component of the vehicle 202 or may be removably located at the vehicle 202. The radar device 204 may be a separate device, which may be associated with the vehicle 202. A ranging radar (e.g., radar device 204) may be incorporated in the vehicle 202 for performing collision avoidance and other related techniques. Vehicle 210 may similarly include a ranging radar. Although FIG. 2 illustrates an example of a radar application for a vehicle, the aspects described in connection with FIG. 2 are similarly applicable to non-vehicular radar devices. A radar device 204 at the vehicle 202 may be configured to transmit a radar signal/pulse (e.g., 230) corresponding to an FOV 250 and receive a return signal (e.g., reflected signal 232) based on a reflection of the radar signal from an object, which may be referred to as a target. The radar device 204 at the vehicle 202 may measure a time delay between transmission of the radar signal and reception of the return (e.g., reflected) signal for determining a distance to the object from which the return signal was reflected. In some cases, the radar device 204 may detect a false target, or may falsely detect a target, based on an interfering radar signal from another radar device. A false target, or a false detection of a target, refers to the detection of a target at a location that is not an accurate presence of a target and is instead due to interference. FIG. 2 illustrates the vehicle 210 having another radar device that may transmit similar radar signals (e.g., direct transmission 234) to the radar device 204. As illustrated in the example in FIG. 2, the radar signal 230 from the radar device 204 may be reflected from one or more targets (e.g., 206 and/or 210). The radar device 204 may also receive interference, such as direct signals (e.g., 234) from the vehicle 210 or device 208 that lead the radar device 204 at the vehicle 202 to detect a false target, or to falsely detect a target at an inaccurate location, based on a shortened distance/time offset and with higher power. For example, if the radar device 204 receives the direct signal from the device 208 and interprets the signal as a reflection of the radar device's own signal, the radar device 204 will falsely detect a target that is closer than the device 208. In some aspects, a false target detection may be based on a reflection of another device's signal rather than a direct signal. For example, the radar device 204 may receive a reflection of the signal from the radar device at the vehicle 210 that is reflected from the device 208. If the radar device 204 at the vehicle 202 is not able to distinguish the signal of other device transmissions from the radar reflections of its own radar signal, the vehicle 202 may misinterpret the received signal and incorrectly measure the distance to the target 206a. The vehicle 202 may determine the presence of a false target 206b at an incorrect location based on the signal.

The interference increases as a number of vehicles equipped with sensing devices, such as ranging radars, increases in a given area. There may be no or little coordination among the sensing devices/radars. For example, the vehicle 210 and the device 208 may transmit radar signals, or other signals, independent of conditions associated with the radar device 204 of the vehicle 202. Therefore, the signal received by the radar device 204 of the vehicle 202 may include not only the return/reflection of the radar device's own signal but may also include a different signal (e.g., interference) transmitted from a radar (e.g., 214) associated with another vehicle, such as the vehicle 210 or another signal from one or more additional devices, such as the device 208. The added signals may lead to detection of false targets, if the radar device 204 interprets the additional signals as a reflection of its own radar signal. Accordingly, multiple radar sources operating in proximity to each other may cause significant interference to other radars of the multiple radar sources. As certain radar waveforms, such as a frequency modulated continuous wave (FMCW), received by the radar device 204 of the vehicle 202 may be signatureless, the radar return signal may be indistinguishable from the different radar signals transmitted from the multiple radar sources.

The vehicle 202 and/or the radar device 204 may be configured to perform aspects in connection with the radar signal sensing component 198 of FIG. 1. Further, the false targets 206b may be configured to perform aspects in connection with the congestion indicator component 199 of FIG. 1.

Figure 3:
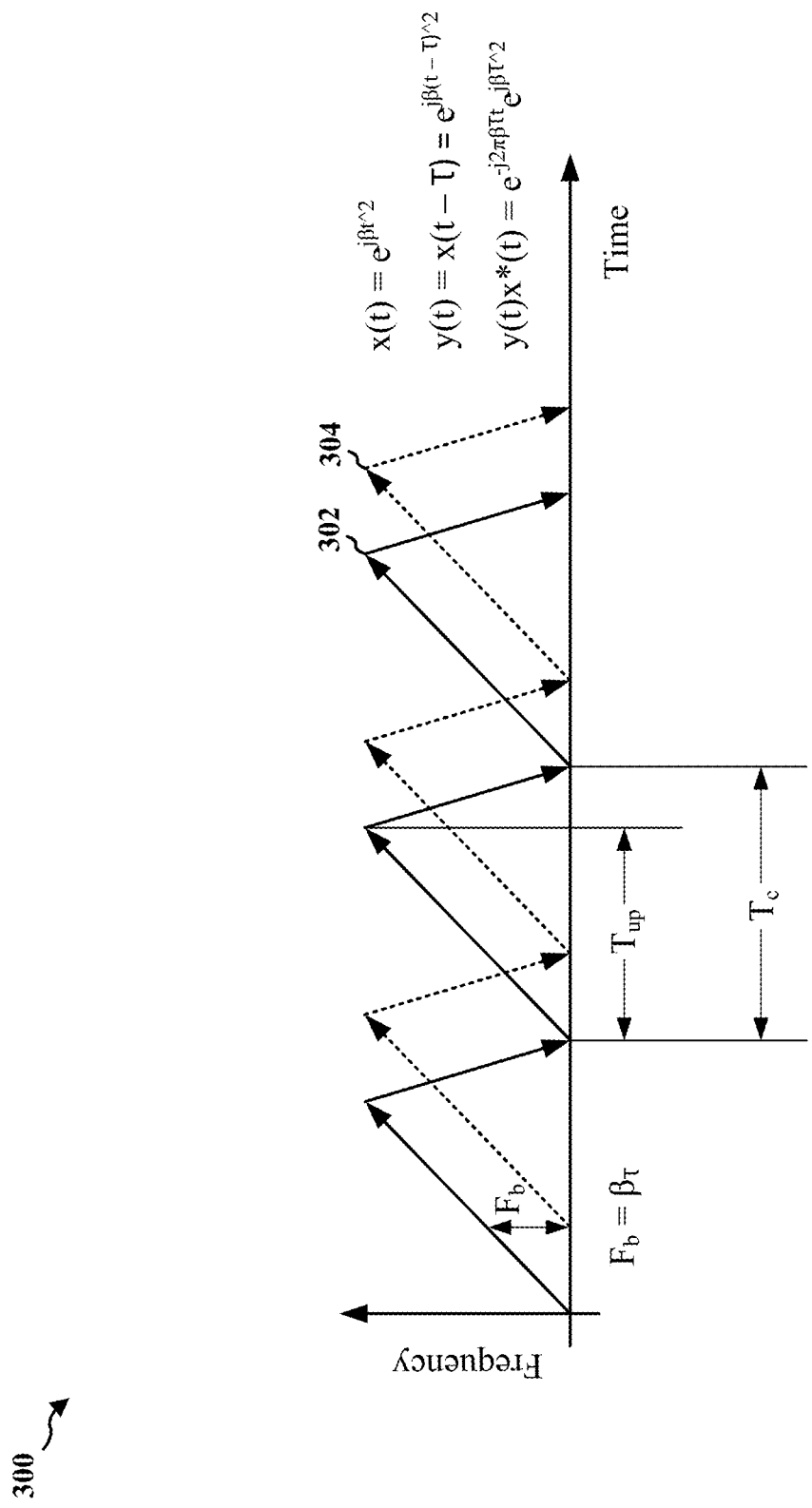
FIG. 3 is a diagram illustrating a transmitted signal and a return signal of a radar.

FIG. 3 is a diagram 300 that illustrates a waveform of a transmitted signal 302 and a corresponding return signal 304 that may be transmitted and received by a radar device, such as the radar device 103 in FIG. 1 and/or the radar device 204 or 214 in FIG. 2. For example, FIG. 2 illustrates the signal 230 transmitted by the radar device 204 in FIG. 2 may correspond to the transmitted signal 302, and the reflected signal 232 in FIG. 2 may correspond to the return signal 304. The signals 302-304 may be associated with an FMCW waveform utilized by the radar for frequency sweeping. The transmitted signal 302 may correspond to an instantaneous frequency that increases from zero to a higher frequency and subsequently decreases from the higher frequency to zero based on a sinusoidal operation. Each sweep up and down may correspond to an individual pulse or chirp of the FMCW. A chirp time may be indicated by $T_c$ and a sweeping up time may be indicated by $T_{up}$. For instance, the frequency may sweep up from 77 GHz to 78 GHz to provide a sweeping bandwidth of 1 GHz. A time period that elapses for the sweeping up of the 1 GHz of bandwidth may correspond to $T_{up}$. After the radar sweeps up to 78 GHz, an additional/non-zero length of time may elapse for the radar to sweep down and return to 77 GHz. The additional/non-zero length of time may correspond to $T_{down}$. Thus, $T_{up}+T_{down}$ may equal $T_c$ (e.g., the duration of the chirp/pulse). In examples, the radar may be configured based on certain $T_c$ parameters.

The radar may receive a series of chirps via the return signal 304 that match the transmitted signal 302, albeit delayed based on a location of an object from which the return signal is reflected. As a distance between the radar and the object increases, the corresponding delay may become larger. The distance to the object may be determined based on determining the delay. For example, rather than directly measuring a time of the delay, a frequency delta between the transmitted signal 302 and the return signal 304 may be determined, where the frequency delta may be proportional to the delay. The range of the object may be further determined based on the delay being proportional to the range. The frequency delta may be associated with a range spectrum and a beat frequency ($F_b$) determined based on a Fast Fourier Transform (FFT). The beat frequency may correspond to a mixed output of the transmitted signal 302 and the return signal 304. A slope for sweeping up the frequency may be defined (e.g., 1 GHz per $T_{up}$ seconds), such that a rate at which the slope changes may correspond to a beta ($\beta$) parameter.

The parameters of the transmitted signal 302 and the return signal 304 may be indicative of a maximum (e.g., theoretical) detectable range of an FMCW receiver of the radar. For longer range radars, 100-300 m may be the maximum detectable range. The parameters may also be indicative of a maximum detectable speed/velocity (e.g., 30-40 m/s). For example, based on multiple received chirps, the velocity of the object may be determined based on a Doppler spectrum and a direction of the object may be determined based on a direction of arrival (DoA) spectrum. In examples, outputs such as $x(t)=e^{j\beta t^2}$; $y(t)=x(t-\tau)=e^{j\beta(t-\tau)^2}$; and/or $y(t)x^*(t)=e^{-j2\pi\beta\tau t}\,e^{j\beta\tau^2}$ may be determined based on the parameters of the FMCW waveform, where x corresponds to a transmitted chirp signal, y corresponds to a received chirp signal, t corresponds to time, j corresponds to $\sqrt{-1}$, and $\tau$ corresponds to a delay between a transmitted chirp and a received chirp. That is, three different frequency analyses may be performed to determine range, velocity, and/or direction.

Figure 4:
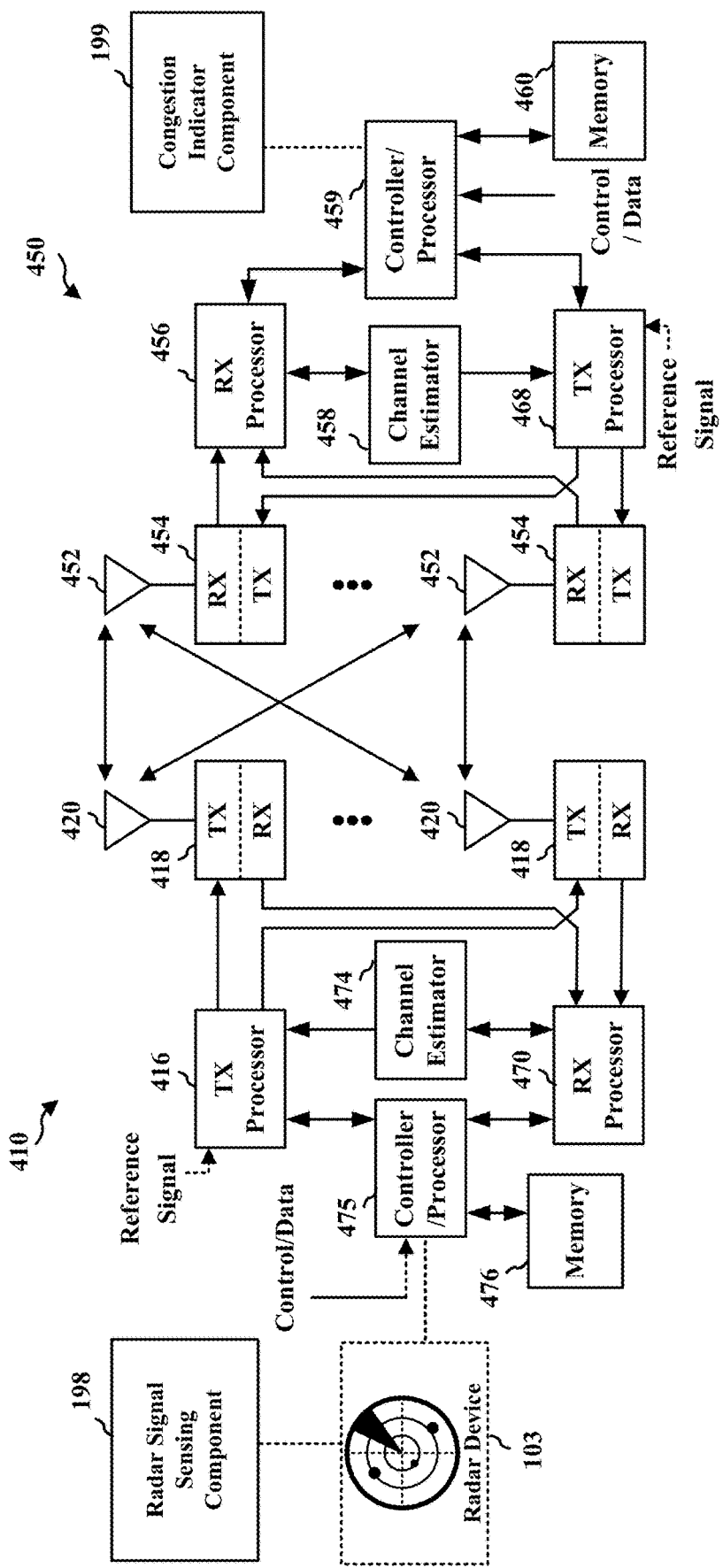
FIG. 4 is a diagram illustrating an example of a wireless device capable of sensing a radar signal.

FIG. 4 is a block diagram of a first wireless device 410 having components for wireless transmission. The wireless device 410 may be a radar device (e.g., similar to the radar device 103) configured to perform the aspects presented herein, or the wireless device may include a radar device 103. For example, the first wireless device 410 may support wireless communication and the transmission and reception of radar signals. In some examples, the wireless device 410 may be capable of communication with another wireless device 450, e.g., based on sidelink and/or an access link, such as described in connection with FIG. 1. The wireless device 410 may include one or more antennas 420 and may include a transmitter/receiver 418 with a corresponding transmit processor 416 and receive processor 470 that are configured to perform radar transmission and measurement, such as described in connection with FIGS. 2-3. The one or more antenna 420, transmitter/receiver 418, transmit processor 416, and receive processor 470 may transmit a radar signal and receive reflections of the radar signal. The controller/processor 475 may determine radio frequency (RF) sensing information about a target based on the received signal. The transmit processor 416 and the receive processor 470 may be in communication with a channel estimator 474.

In some examples, the wireless device 410 may be capable of wireless communication in addition to RF sensing. For communication, packets may be provided to a controller/processor 475. The controller/processor 475 implements layer 3 and layer 2 functionality. The transmit (TX) processor 416 and the receive (RX) processor 470 implement layer 1 functionality associated with various signal processing functions. Different spatial streams may be provided to a different antenna 420 via a separate transmitter TX. Each transmitter TX may modulate an RF carrier with a respective spatial stream for transmission.

At the wireless device 450, each receiver 454 RX receives a signal through its respective antenna 452. Each receiver 454 RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the wireless device 450. If multiple spatial streams are destined for the wireless device 450, they may be combined by the RX processor 456 into a single stream, such as an OFDM symbol stream. The RX processor 456 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, are recovered and demodulated by determining the most likely signal constellation points transmitted by the wireless device 410. These soft decisions may be based on channel estimates computed by the channel estimator 458. The soft decisions may then be decoded and deinterleaved to recover the data and control signals that were originally transmitted by the wireless device 410 on the physical channel. The data and control signals may then be provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing to recover IP packets from the EPC 160. The controller/processor 459 may also be responsible for error detection using an ACK and/or NACK protocol to support HARQ operations.

Channel estimates derived by a channel estimator 458 from a reference signal or feedback transmitted by the wireless device may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The received transmission may be processed at the wireless device 410 in a manner similar to that described in connection with the receiver function at the wireless device 450. Each receiver RX receives a signal through its respective antenna 420. Each receiver RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover packets from the wireless device 450. The controller/processor 475 may also be responsible for error detection using an ACK and/or NACK protocol to support HARQ operations.

At least one of the TX processor 416, the RX processor 470, or the controller/processor 475 may be configured to perform aspects in connection with the radar signal sensing component 198 of FIG. 1 to adjust a radar transmission based on a congestion level in a wireless communication environment.

At least one of the TX processor 468, the RX processor 456, or the controller/processor 459 may be configured to perform aspects in connection with the congestion indicator component 199 of FIG. 1 to reduce congestion in a wireless communication environment.

Figure 5B:
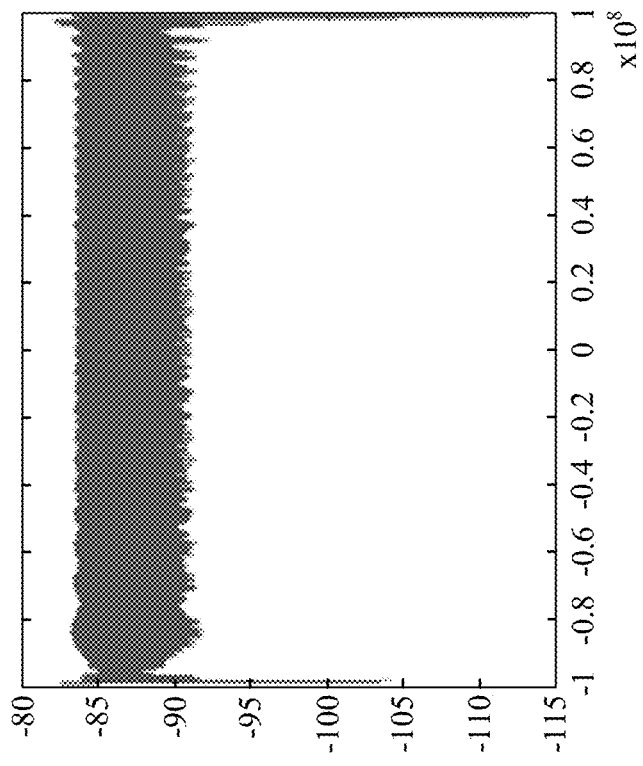
FIGS. 5A-5B illustrate example range spectrum diagrams.
Figure 5A:
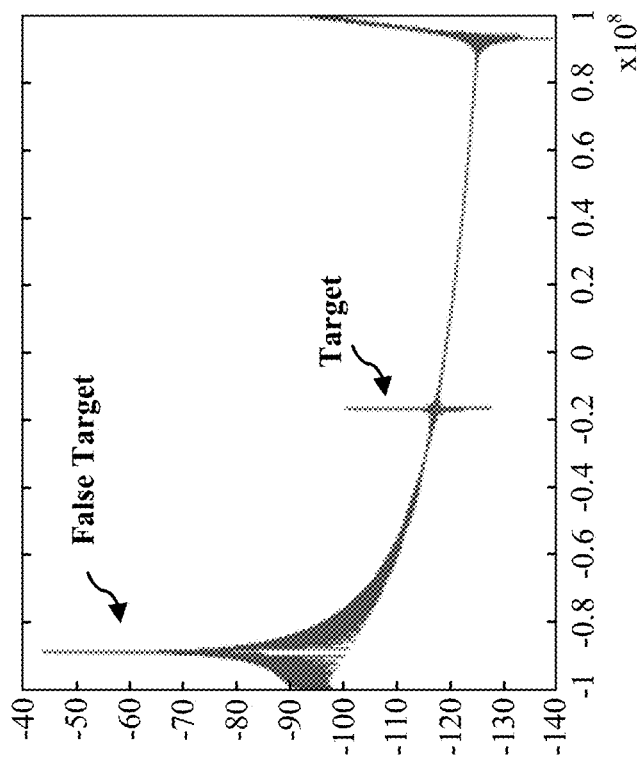

FIGS. 5A-5B illustrate range spectrum diagrams 500-550. If transmitted signals of a radar and an interferer (e.g. a radar component associated with the vehicle 202 and the separate radar device 204) sweep the frequency in a same direction, interference received by the radar may cause a false peak (e.g., "ghost target") to be indicated on the range spectrum. For example, a target may be indicated as a peak on the diagram 500 based on a received signal (of the radar device's own radar signal) reflected from the target. A false peak may occur when the radar device receives a signal from a different device (e.g., a different radar device, sensing device, etc.) rather than its own reflected signal. However, because an interferer signal may be indistinguishable from a signal of the intended target, the peak may correspond to the interferer/false target.

If transmitted signals of the radar and the interferer sweep the frequency in opposite directions, interference received by the radar may cause wideband noise to be indicated on the range spectrum. For example, the interferer may utilize different chirps, such as for sweeping down the frequency while the radar is sweeping up the frequency in an opposite sweeping direction. In such cases, the interferer may be indicated as wideband noise, as illustrated in the diagram 550. Regardless of whether the interference is indicated as a peak or as wideband noise, the interference may be severe enough that the intended target may not be detectable. For instance, a level of wideband noise may correspond to −85 dB, while the intended target may correspond to a lower dB level, such as −100 dB.

The radar may transmit a series of pulses into an environment for which the radar may already have information indicative of intended targets and/or clutter located in a field of view (FOV) of the radar. For example, the radar may have such information for performing tracking operations. By identifying the false peaks and/or measuring the noise level, the radar may determine a portion of the received power that is not associated with a return signal of the radar. The congestion level may also be determined based on the portion of the received power that is not associated with the return signal of the radar. Additionally, or alternatively, the radar may pause operations and "listen" for signals from other radar signal transmitters. Radar signals received (e.g., from the other radar signal transmitters) during the paused operations of the radar may be indicative of the congestion level.

Figure 6:
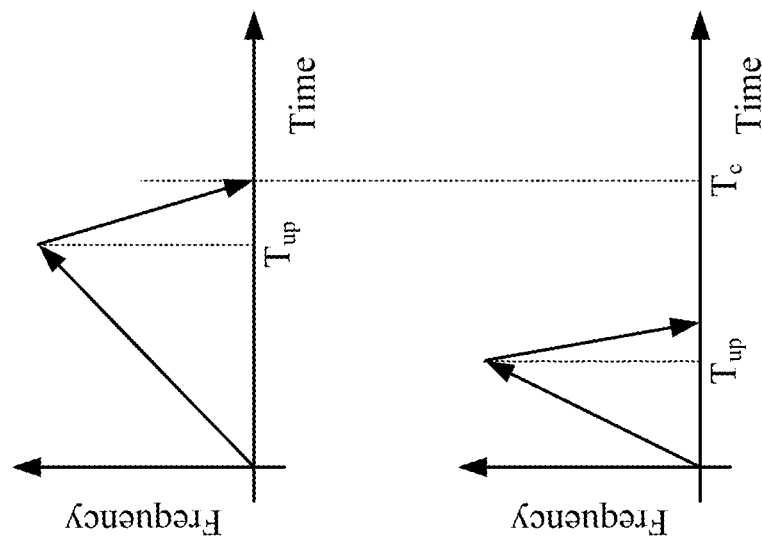
FIG. 6 illustrates examples for reducing a maximum range of a radar.

FIG. 6 is a diagram 600 that illustrates parameter adjustments to reduce a range of a radar, according to one example. The radar may be utilized by a vehicle to perform collision avoidance techniques based on detection of objects, such as other vehicles, pedestrians, etc., in proximity to the radar/vehicle. In a congested environment (e.g., an environment having other radar devices transmitting interfering radar signals), detection of closer objects/targets may be of higher priority than detection of objects/targets that are farther away. For instance, vehicle navigation techniques in urban environments may prioritize detection of objects that are 20 m away over detection of objects that are 200 m, as driving speeds may be slower in such environments. While objects that are far away may still be detected in some cases, the radar/vehicle may be configured to determine that detection of the far away objects may decrease in priority as the congestion level of radar signals in the environment increases. That is, detection of objects that are closer to the radar/vehicle may increase in priority as the congestion level increases.

Congestion sensing by the radar/vehicle may be performed based on a content and a number of detected messages. In one example, a radar device associated with a vehicle may determine a congestion level based on content and/or a number of detected messages such as vehicle-to-vehicle (V2V) messages, vehicle-to-infrastructure (V2I) messages, and/or vehicle-to-everything (V2X) messages. In another example, a radar device may determine a congestion level based on content or an amount of sidelink messages. In other examples, the detected messages may be sidelink messages that are not associated with a vehicle or may be non-sidelink messages that provide information about other radar devices and/or radar congestion. The messages may be configured for other vehicles and devices to communicate with the radar/vehicle. The congestion level may be determined based on a number of messages received by the radar, which may be further indicative of a number of target objects in proximity to the radar/vehicle. For example, a UE being carried by a pedestrian may be configured to periodically transmit location information that may be received by the vehicle and indicate a location of the pedestrian with respect to the vehicle.

Based on vehicle message channels, infrastructure such as a base station may also communicate with the radar/vehicle. In examples, communications received from the base station may be based on messages transmitted by other devices, such as the UE carried by the pedestrian. The infrastructure may provide an indication of the congestion level to the vehicle when the infrastructure determines that there is a threshold level of congestion in proximity to the vehicle.

Additionally, congestion sensing may be performed by the radar based on interference determined from a false peak or an increased noise floor on a range spectrum. In examples, location tracking information may be utilized together with interference information to perform the congestion sensing. In less congested environments, a radar image may be associated with a nominal noise floor. For example, some targets may be determined based on the radar image, which may or may not include a nominal amount of interference. However, in higher congestion environments, the noise floor may be increased, which may correspond to more targets on the radar image and/or a high level of interference. Hence, the congestion level of the environment may be determined by the radar/vehicle based on the radar image.

As long as radar signal transmissions are configured to be adapted based on a congestion measure or a congestion indicator, the technique that is used for determining the congestion level may vary. After the congestion level is determined to exceed a defined threshold based on a congestion sensing technique, a detection range of the radar waveform may be reduced, which may thereby provide decreased interference. The congestion level exceeding the defined threshold may indicate that detection of longer range objects in a field of view may be of decreased priority, and that the detection range of the radar may be decreased to prioritize detection of shorter range objects.

A maximum detectable range ($R_{max}$) may be determined based on parameters such as the speed of light (c), a bandwidth (B) that is swept by the radar (e.g., 1 GHz, 500 MHz, etc.), a sweeping up time ($T_{up}$), and a sampling frequency ($f_s$). That is, $R_{max}=(c/2B)T_{up}f_s$. The maximum detectable range may be decreased by decreasing $T_{up}$. For example, as indicated in the diagram 600, if $T_{up}$ is decreased by half without adjusting the bandwidth or the sampling frequency, $R_{max}$ may likewise be decreased by half.

In a field of view having a shortened detection range, the radar may be configured to detect a same velocity as detectable for the field of view having the longer detection range. That is, $V_{max}=c/(4f_cT_c)$. The carrier frequency ($f_c$) and the chirp time ($T_c$) may remain unchanged. By reducing $T_{up}$, a duration of the transmitted pulse may be shortened but the radar may continue to transmit further chirps based on $T_c$. Therefore, discontinuous transmission (DTX) between the chirps is increased and, based on the increased DTX, the likelihood of interference may be decreased, thus decreasing the interference level.

Further, the transmit power ($P_{tx}$) used to overcome a path loss of the radar signal for realizing a defined receive power ($P_{rx}$) may be reduced based on the shortened range of the field of view. That is, a maximum path loss may become smaller as the range of the field of view is decreased. Thus, decreasing the transmit power may provide decreased interference. For example, $P_{rx}=P_{tx}+G_{tx}+G_{rx}+RCS-30 \log 10(4\pi)-40 \log_{10} R$, where $G_{tx}$ corresponds to a transmit gain, $G_{rx}$ corresponds to a receive gain, RCS corresponds to a radar cross section, and R corresponds to a range of the radar.

FIGS. 7A-7B illustrate diagrams 700-750 corresponding to different ranges of a field of view of a radar. For example, the diagram 700 corresponds to a longer range for the field of view and the diagram 750 corresponds to a shorter range for the field of view. The shorter time duration for each chirp or pulse in FIG. 7B corresponds to a shorter range for the field of view of the radar device. The radar may detect the congestion level based on a number of devices/transmitted signals in proximity to the radar. If the congestion level exceeds a threshold, the radar may reduce the maximum detection range (e.g., of the diagram 700) by reducing the sweeping up time ($T_{up}$). Hence, a larger DTX may be provided between pulses (e.g., to provide the diagram 750). The transmit power may also be reduced based on reducing the maximum detection range.

By shortening the range of the field of view, the radar may prioritize detection of closer objects without impacting detection of a speed or a direction of the objects. That is, only the range of the radar is reduced for reducing interference and increase detection of the closer objects. Shortening the range of the field of view may also cause the radar to generate less interference to other devices in proximity to the radar.

Accordingly, a radar signal may be adapted based on detection of congestion in a wireless communication environment. For example, short-distance radar may be more reliable in congested environments. Thus, a radar node may adjust one or more parameters of the radar signal for short range sensing, such as by reducing the chirp length and/or the transmit power.

Figure 8:
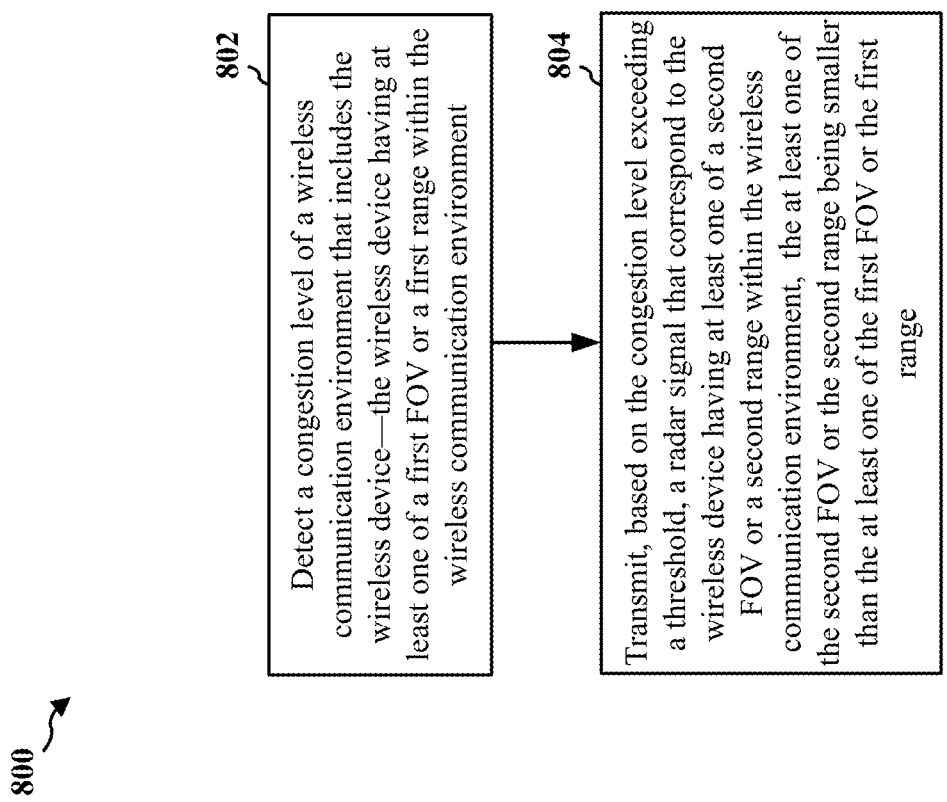
FIG. 8 is a flowchart of a method of wireless communication at a wireless device according to one example.

FIG. 8 is a flowchart 800 of a method of wireless communication at a wireless device. The wireless device may be the radar device 103, 204; the vehicle 202; and/or an apparatus 1202 (e.g., a vehicular radar or a non-vehicular radar). The method may be performed to reduce interference at or by the wireless device.

At 802, the wireless device may detect a congestion level of a wireless communication environment that includes the wireless device—the wireless device having at least one of a first FOV or a first range within the wireless communication environment. For example, referring to FIGS. 1 and 7, the radar device 103 may detect congestion via communication with a UE 104, which may be an RSU or another radar device, measuring the wireless communication environment (e.g., via wireless signal 105), etc. The diagram 700 illustrates a longer range for a FOV (e.g., first FOV and first range of the radar device 103/204). The detection, at 802, may be performed by the detection component 1240 of the apparatus 1202 in FIG. 12.

At 804, the wireless device may transmit, based on the congestion level exceeding a threshold, a radar signal that correspond to the wireless device having at least one of a second FOV or a second range within the wireless communication environment, the at least one of the second FOV or the second range being smaller than the at least one of the first FOV or the first range. For example, referring to FIGS. 1-2 and 7, the radar device 103/204 may transmit the radar signal 105 that corresponds to the shorter range FOV illustrated in the diagram 750, rather than the longer range FOV illustrated in the diagram 700. The at least one of the second FOV or the second range (e.g., illustrated in the diagram 750) that is smaller than the at least one of the first FOV or the first range (e.g., illustrated in the diagram 700) may increase a detection accuracy of the radar device 103/204 for one or more targets 107/206a in the wireless communication environment. The transmission, at 804, may be performed by the transmission component 1234 of the apparatus 1202 in FIG. 12.

Figure 9:
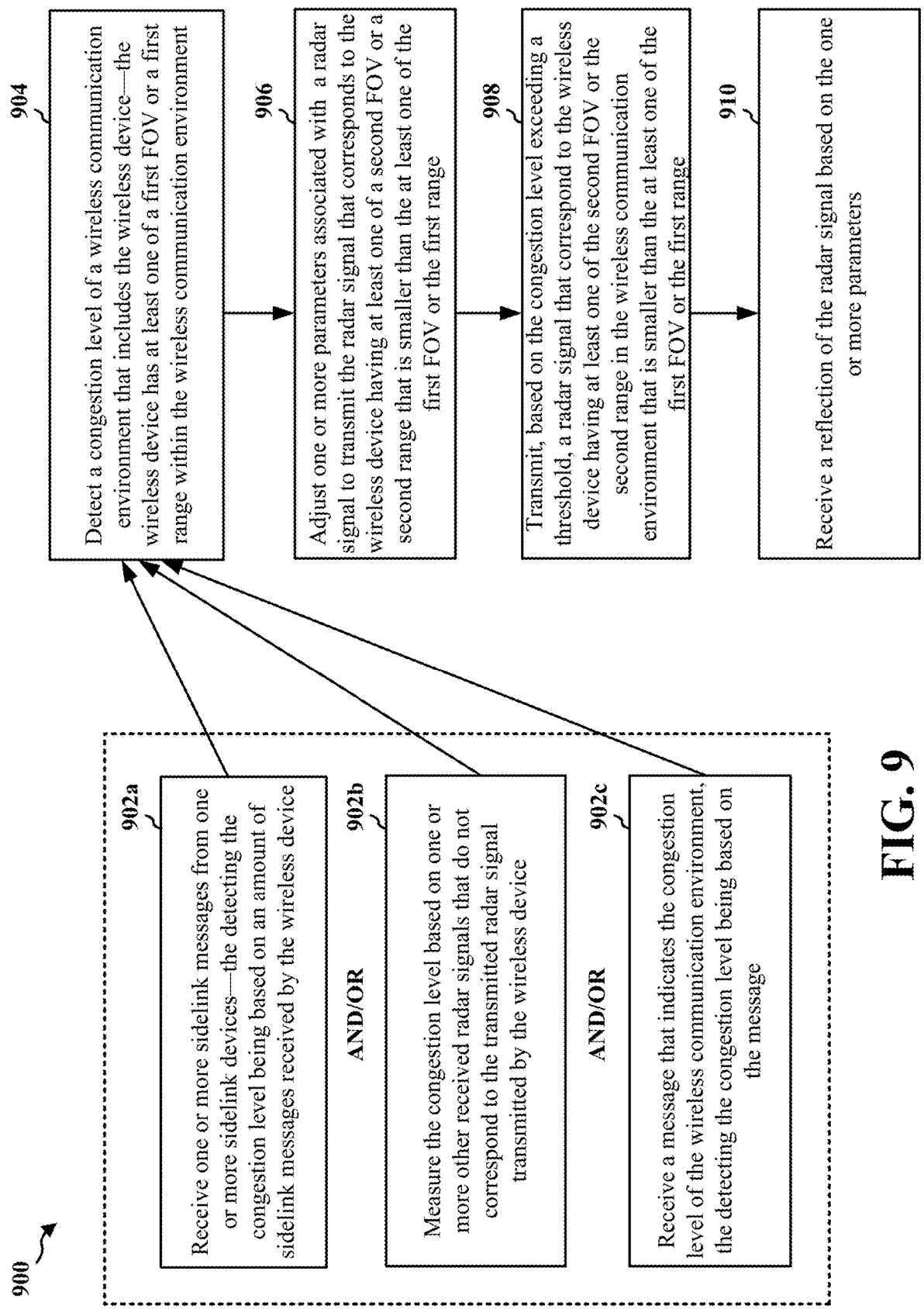
FIG. 9 is a flowchart of a method of wireless communication at a wireless device according to one example.

FIG. 9 is a flowchart 900 of a method of wireless communication at a wireless device. The wireless device may be the radar device 103, 204; the vehicle 202; and/or an apparatus 1202 (e.g., a vehicular radar or a non-vehicular radar). The method may be performed to reduce interference at or by the wireless device.

At 902a, the wireless device may receive one or more sidelink messages from one or more sidelink devices, wherein the detection of the congestion level being based on an amount of sidelink messages received by the wireless device. For example, referring to FIG. 1, certain UEs 104, which may include the radar device 103, may communicate with each other using the D2D communication link 158 via one or more sidelink channels. The reception, at 902a, may be performed by the reception component 1230 of the apparatus 1202 in FIG. 12.

At 902a, the wireless device may receive one or more sidelink messages from one or more sidelink devices, wherein the detection of the congestion level is based on an amount of sidelink messages received by the wireless device. For example, referring to FIG. 1, certain UEs 104, which may include the radar device 103, may communicate with each other using the D2D communication link 158 via one or more sidelink channels. The reception, at 902a, may be performed by the reception component 1230 of the apparatus 1202 in FIG. 12.

At 902c, the wireless device may additionally or alternatively receive a message that indicates, to the wireless device, the congestion level of the wireless communication environment—the wireless device detects the congestion level based on the message. For example, referring to FIG. 1, certain UEs 104, which may include the radar device 103, may communicate with each other using the D2D communication link 158 via one or more sidelink channels. In aspects, the message may be received from at least one of a base station 102 or a sidelink device, such as the UE 104/RSU. The reception, at 902c, may be performed by the reception component 1230 of the apparatus 1202 in FIG. 12.

At 904, the wireless device may (e.g., based on any of 902a-902c) detect a congestion level of a wireless communication environment that includes the wireless device—the wireless device has at least one of a first FOV or a first range within the wireless communication environment. For example, referring to FIGS. 1 and 7, the radar device 103 may detect congestion via communication with a UE 104, which may be an RSU or another radar device, measuring the wireless communication environment (e.g., via wireless signal 105), etc. The diagram 700 illustrates a longer range for a FOV (e.g., first FOV and first range of the radar device 103/204). The wireless device (e.g., radar device 103) may be a vehicular radar or a non-vehicular radar. The detection, at 904, may be performed by the detection component 1240 of the apparatus 1202 in FIG. 12. The at least one of the second FOV or the second range that is smaller than the at least one of the first FOV or the first range may correspond to at least one of a first decrease in interference associated with the transmitted radar signal or a second decrease in interference associated with the received reflection of the radar signal.

At 906, the wireless device may adjust one or more parameters of a radar signal to transmit the radar signal that corresponds to the wireless device having at least one of a second FOV or a second range that is smaller than the at least one of the first FOV or the first range. For example, the wireless device may decrease the at least one of the first FOV or the first range to the at least one of the second FOV or the second range. The wireless device may increase a DTX time between chirps, pulses, or transmissions of the radar signal. For example, referring to FIGS. 1-2 and 6-7, the diagram 600 illustrates parameter adjustments for decreasing a range of the radar device 103. The diagram 750 illustrates a shorter range for a FOV (e.g., second FOV and second range of the radar device 103/204) that is smaller than the longer range for the FOV (e.g., first FOV and first range of the radar device 103/204) illustrated in the diagram 700. Based on the diagram 600, the one wireless device may decrease a sweeping up time ($T_{up}$) of the radar signal transmitted by the radar device 103/204. The wireless device may decrease a transmit power ($P_{tx}$) of the radar signal 105 transmitted by the radar device 103/204. The $P_{tx}$ may correspond to a decreased path loss of the radar signal 105 transmitted by the radar device 103/204. The adjustment, at 906, may be performed by the transmission component 1234 of the apparatus 1202 in FIG. 12.

At 908, the wireless device may transmit, based on the congestion level exceeding a threshold, a radar signal that correspond to the wireless device having at least one of the second FOV or the second range in the wireless communication environment that is smaller than the at least one of the first FOV or the first range. For example, referring to FIGS. 1-2 and 7, the radar device 103/204 may transmit the radar signal 105 that corresponds to the shorter range FOV illustrated in the diagram 750, rather than the longer range FOV illustrated in the diagram 700. The at least one of the second FOV or the second range (e.g., illustrated in the diagram 750) that is smaller than the at least one of the first FOV or the first range (e.g., illustrated in the diagram 700) may increase a detection accuracy of the radar device 103/204 for one or more targets 107/206a in the wireless communication environment. The transmission, at 908, may be performed by the transmission component 1234 of the apparatus 1202 in FIG. 12.

At 910, the wireless device may receive a reflection of the radar signal based on the one or more parameters. For example, referring to FIGS. 1-2 and 6, the radar device 103/204 may receive a reflected signal from the target 206a (e.g., based on the parameters illustrated in the diagram 600). The at least one of the second FOV or the second range (e.g., illustrated in the diagram 750) that is smaller than the at least one of the first FOV or the first range (e.g., illustrated in the diagram 700) may correspond to at least one of a first decrease in interference of the radar signal 105 transmitted by the radar device 103/204 or a second decrease in interference to the reflection of the radar signal received at the radar device 204. The interference may be decreased based on an increase to a DTX time between chirps of the radar device 103/204. The reception, at 910, may be performed by the reception component 1230 of the apparatus 1202 in FIG. 12.

Figure 10:
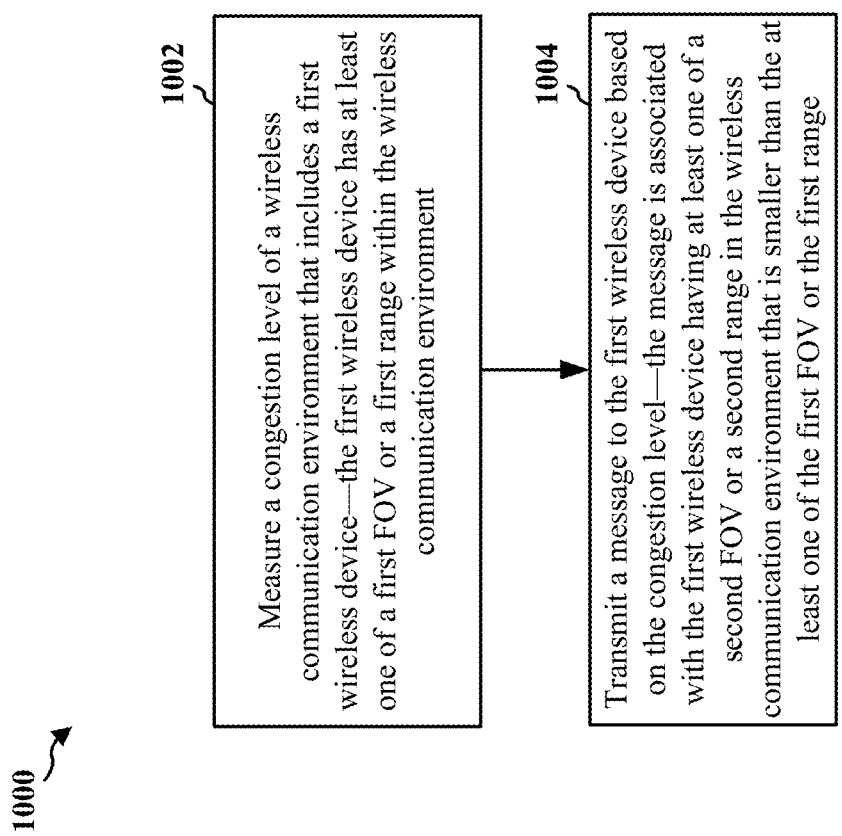
FIG. 10 is a flowchart of a method of wireless communication at a second wireless device according to one example.

FIG. 10 is a flowchart 1000 of a method of wireless communication at a second wireless device. The second wireless device may be the UE 104, the base station 102, the false target 206b; and/or an apparatus 1202 (e.g., a vehicular/non-vehicular radar, a roadside unit (RSU), etc.). The method may be performed to reduce congestion in a wireless environment.

At 1002, the second wireless device may measure a congestion level of a wireless communication environment that includes a first wireless device—the first wireless device has at least one of a first FOV or a first range within the wireless communication environment. For example, referring to FIGS. 1 and 7, the UE 104 measure radar signals, such as the radar signal 105 of the radar device 103 to determine a congestion level in a wireless communication environment. The diagram 700 illustrates that the radar device 103 may have a longer range for the FOV (e.g., first FOV and first range of the radar device 103). The measurement, at 1002, may be performed by the measurement component 1246 of the apparatus 1202 in FIG. 12.

At 1004, the second wireless device may transmit a message to the first wireless device based on the congestion level—the message being associated with the first wireless device having at least one of a second FOV or a second range in the wireless communication environment that is smaller than the at least one of the first FOV or the first range. For example, referring to FIGS. 1 and 7, the UE 104, which may correspond to an RSU or other sidelink device, may communicate with the radar device 103 using the D2D communication link 158 via one or more sidelink channels. The communication may be associated with at least one of the second FOV or the second range (e.g., illustrated in the diagram 750) that is smaller than the at least one of the first FOV or the first range (e.g., illustrated in the diagram 700). The transmission, at 1004, may be performed by the transmission component 1234 of the apparatus 1202 in FIG. 12. For example, the message may include one or more parameters relating to a decrease in the at least one FOV or the first range to the second FOV or the second range.

Figure 11:
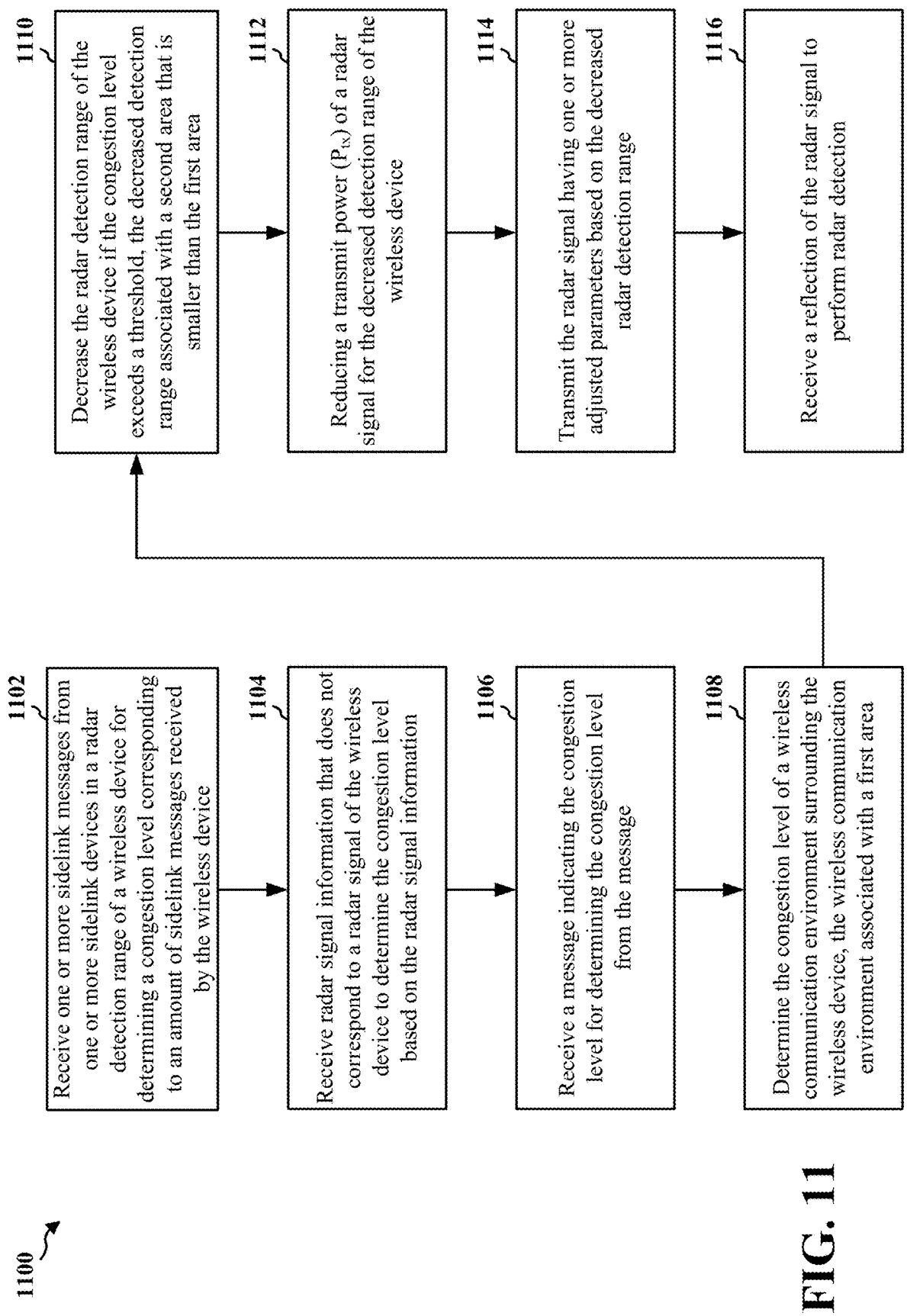
FIG. 11 is a flowchart of a method of wireless communication at a wireless device according to one example.

FIG. 11 is a flowchart 1100 of a method of wireless communication at a wireless device. The wireless device may be the radar device 103, 204; the vehicle 202; and/or an apparatus 1202 (e.g., a vehicular radar or a non-vehicular radar). The method may be performed to reduce interference at or by the wireless device.

At 1102, the wireless device may receive one or more sidelink messages from one or more sidelink devices in a radar detection range of a wireless device for determining a congestion level corresponding to an amount of sidelink messages received by the wireless device. The reception may be performed, e.g., by the reception component 1230 of the RF baseband processor 1204 in the apparatus 1202. For example, referring to FIG. 1, certain UEs 104, which may include the radar device 103, may communicate with each other using the D2D communication link 158 via one or more sidelink channels. An interference/congestion level within a range of the wireless signal 105 may be determined based on a number of communications received by the UE 104/radar device 103 over the D2D communication link 158.

At 1104, the wireless device may receive radar signal information that does not correspond to a radar signal of the wireless device to determine the congestion level based on the radar signal information. For example, referring to FIGS. 1 and 5, the radar device 103 may determine the interference/congestion level based on a peak and/or wideband noise in a range spectrum (e.g., range spectrum diagrams 500-550), where the peak and/or the wideband noise may be associated with radar signals of other radar signal transmitters. The reception may be performed, e.g., by the reception component 1230 of the RF baseband processor 1204 of the apparatus 1202.

At 1106, the wireless device may receive a message indicating the congestion level for determining the congestion level from the message. For example, referring to FIG. 1, certain UEs 104, which may include the radar device 103, may receive a message from another device via a Uu communication link 120 and/or the D2D communication link 158. The UE 104/radar device 103 may determine the congestion level based on the received message. In examples, the message may be received from a base station 102/180 or a sidelink device (e.g., a second UE 104). The reception may be performed, e.g., by the reception component 1230 of the RF baseband processor 1204 of the apparatus 1202.

At 1108, the wireless device may determine the congestion level of a wireless communication environment surrounding the wireless device, the wireless communication environment associated with a first area. For example, referring to FIGS. 1 and 5, the radar device 103 may determine the interference/congestion level in at least a first portion of the access network environment that surrounds the radar device 103, e.g., based on a peak and/or wideband noise in the range spectrum diagrams 500-550. The determination may be performed, e.g., by the detection component 1240 of the RF sensing manager 1232 of the apparatus 1202.

At 1110, the wireless device may decrease the radar detection range of the wireless device if the congestion level exceeds a threshold, the decreased detection range associated with a second area that is smaller than the first area. The reduction may be performed, e.g., by the range reduction component 1242 of the RF sensing manager 1232 of the apparatus 1202. For example, referring to FIGS. 1 and 5-6, the radar device 103 may shorten a range of the field of view in accordance with the diagram 750 based on the peak and/or the wideband noise exceeding a threshold dB indicative of a threshold congestion level in the range spectrum diagrams 500-550. The decreased range of the diagram 750 may correspond to at least a second portion of the access network environment that surrounds the radar device 103. The detection range of the wireless device (e.g., radar device 103) may be decreased based on reducing a sweeping up time ($T_{up}$) (e.g., as indicated via the diagrams 600 and 750) of the radar signal 105 emitted by the wireless/radar device 103. The decreased radar detection range (e.g., indicated via the diagrams 600 and 750) may reduce interference caused by one or more sensor signals 105 emitted by the one or more other devices (e.g., UEs 104 and/or base station 102/180). The interference may be reduced based on an increased DTX time between chirps ($T_c$) of the wireless device/radar device 103, as illustrated in the diagram 750. The decreased detection range (e.g., associated with the diagram 750) may increase detection of a target object in the second area of the access network that is smaller than the first area of the access network.

At 1112, the wireless device may reduce a transmit power ($P_{tx}$) of a radar signal for the decreased detection range of the wireless device. The reduction may be performed, e.g., by the transmission power reduction component 1244 of the RF sensing manager 1232 of the apparatus 1202. For example, referring to FIGS. 1 and 6-7, the radar device 103 may reduce the $P_{tx}$ of the radar signal 105 based on the diagram 600 to decrease a range of a field of view of the radar device 103, as indicated via the diagrams 700-750. The reduced $P_{tx}$ may be associated with a reduced path loss, as indicated via the diagram 600, for the radar signal 105 emitted by the wireless/radar device 103.

At 1114, the wireless device may transmit the radar signal having one or more adjusted parameters based on the decreased radar detection range. For example, referring to FIGS. 1 and 6-7, the radar device 103 may transmit the wireless signal 105 based on the parameters indicated via the diagram 600 to shorten the range of the field of view, as illustrated via the diagram 750. The transmission may be performed, e.g., by the transmission component 1234 of the apparatus 1202.

At 1116, the wireless device may receive a reflection of the radar signal to perform radar detection. For example, referring to FIG. 2, the vehicle 202 may receive a reflected signal to detect a target 206a. The reception may be performed, e.g., by the reception component 1230 of the RF baseband processor 1204 of the apparatus 1202.

Figure 12:
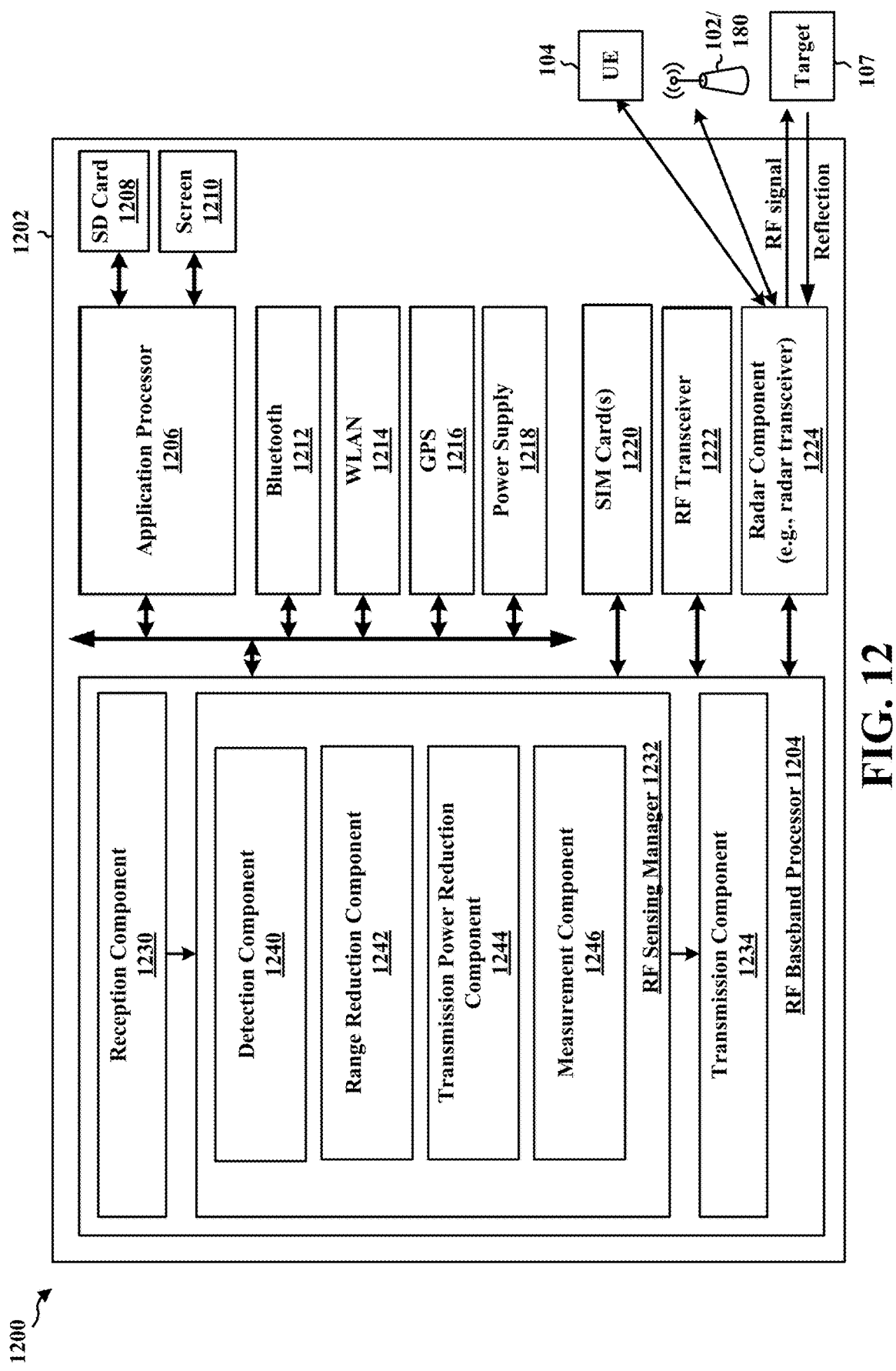
FIG. 12 is a diagram illustrating an example of a hardware implementation for an example apparatus.

FIG. 12 is a diagram 1200 illustrating an example of a hardware implementation for an apparatus 1202. The apparatus 1202 is a radar signal sensing device and includes an RF baseband processor 1204 (also referred to as a modem) coupled to an RF transceiver 1222 and a radar component 1224, such as a radar transceiver. In some examples, the apparatus may be capable of wireless communication in addition to radar signal sensing. For example, the apparatus may be a radar device, a UE, a base station, or another access point that is capable of radar signal sensing. If the radar signal sensing device is a UE, the processor may be coupled to one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The RF baseband processor 1204 communicates through the RF transceiver 1222 and/or the radar component 1224 with the UE 104 and/or BS 102/180. The RF baseband processor 1204 may include a computer-readable medium/memory. The computer-readable medium/memory may be non-transitory. The RF baseband processor 1204 is responsible for general processing, including the execution of software stored on the computer-readable medium/memory. The software, when executed by the RF baseband processor 1204, causes the RF baseband processor 1204 to perform the various functions described supra. The computer-readable medium/memory may also be used for storing data that is manipulated by the RF baseband processor 1204 when executing software. The RF baseband processor 1204 further includes a reception component 1230, an RF sensing manager 1232, and a transmission component 1234. The RF sensing manager 1232 includes the one or more illustrated components. The components within the RF sensing manager 1232 may be stored in the computer-readable medium/memory and/or configured as hardware within the RF baseband processor 1204. The RF baseband processor 1204 may be a component of the wireless device 450 and may include the memory 460 and/or at least one of the TX processor 468, the RX processor 456, and the controller/processor 459. In one configuration, the apparatus 1202 may be a modem chip and include just the RF baseband processor 1204, and in another configuration, the apparatus 1202 may be the entire RF sensing device (e.g., radar device 103) and include the additional modules of the apparatus 1202.

The reception component 1230 may be configured, e.g., as described in connection with 1102, 1104, 1106, and 1116, to receive one or more sidelink messages from one or more sidelink devices in a radar detection range of a wireless device for determining a congestion level corresponding to an amount of sidelink messages received by the wireless device; to receive radar signal information that does not correspond to a radar signal of the wireless device to determine the congestion level based on the radar signal information; to receive a message indicating the congestion level for determining the congestion level from the message; and to receive a reflection of the radar signal to perform radar detection. The RF sensing manager 1232 may include a detection component 1240 that is configured, e.g., as described in connection with 1108, to determine the congestion level of a wireless communication environment surrounding the wireless device, the wireless communication environment associated with a first area. The RF sensing manager 1232 may further include a range reduction component 1242 that is configured, e.g., as described in connection with 1110, to decrease the radar detection range of the wireless device if the congestion level exceeds a threshold, the decreased detection range associated with a second area that is smaller than the first area. The RF sensing manager 1232 may further include a transmission power reduction component 1244 that is configured, e.g., as described in connection with 1112, to reduce a transmit power ($P_{tx}$) of a radar signal for the decreased detection range of the wireless device. The transmission component 1234 may be configured, e.g., as described in connection with 1114, to transmit the radar signal having one or more adjusted parameters based on the decreased radar detection range.

In further aspects, the reception component 1230 may be configured, e.g., as described in connection with 902a, 902c, and 910, to receive one or more sidelink messages from one or more sidelink devices—the wireless device detects the congestion level based on an amount of sidelink messages received by the wireless device; to receive a message that indicates, to the wireless device, the congestion level of the wireless communication environment—the wireless device detects the congestion level based on the message; and to receive a reflection of the radar signal based on the one or more parameters. The RF sensing manager 1232 may further include a measurement component 1246 that is configured, e.g., as described in connection with 902b, to measure the congestion level based on one or more other radar signals received by the wireless device that do not correspond to the radar signal transmitted by the wireless device—the wireless device detects the congestion level based on measuring the one or more other radar signals. The RF sensing manager 1232 may further include a detection component 1240 that is configured, e.g., as described in connection with 802 and 904, to detect a congestion level of a wireless communication environment that includes the wireless device—the wireless device has at least one of a first FOV or a first range within the wireless communication environment. The transmission component 1234 may be configured, e.g., as described in connection with 804, 906, and 908, to adjust one or more parameters of a radar signal to transmit the radar signal that corresponds to the wireless device having at least one of a second FOV or a second range that is smaller than the at least one of the first FOV or the first range; and to transmit, based on the congestion level exceeding a threshold, a radar signal that correspond to the wireless device having at least one of the second FOV or the second range in the wireless communication environment that is smaller than the at least one of the first FOV or the first range.

In further aspects, the RF sensing manager 1232 may further include a measurement component 1246 that is configured, e.g., as described in connection with 1002, to measure a congestion level of a wireless communication environment that includes a first wireless device—the first wireless device has at least one of a first FOV or a first range within the wireless communication environment. The transmission component 1234 may be configured, e.g., as described in connection with 1004, to transmit a message to the first wireless device based on the congestion level—the message is associated with the first wireless device having at least one of a second FOV or a second range in the wireless communication environment that is smaller than the at least one of the first FOV or the first range.

The apparatus may include additional components that perform each of the blocks of the algorithm in the aforementioned flowcharts of FIGS. 8-11. As such, each block in the aforementioned flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the RF baseband processor 1204, includes means for determining a congestion level of a wireless communication environment surrounding the wireless device, the wireless communication environment associated with a first area (e.g., at least the detection component 1240 of the RF sensing manager 1232); and means for decreasing a radar detection range of the wireless device if the congestion level exceeds a threshold, the decreased detection range associated with a second area that is smaller than the first area (e.g., at least the range reduction component 1242). The apparatus 1202 may further include means for transmitting a radar signal having one or more adjusted parameters based on the decreased radar detection range (e.g., at least the transmission component 1234 and/or RF transceiver); and means for receiving a reflection of the radar signal to perform radar detection (e.g., at least the reception component 1230, the RF transceiver 1222, and/or the radar component 1224). The apparatus 1202 may further include means for reducing a transmit power ($P_{tx}$) of a radar signal for the decreased detection range of the wireless device (e.g., at least the transmission power reduction component 1244). The apparatus 1202 may further include means for receiving one or more sidelink messages from one or more sidelink devices in the radar detection range of the wireless device, wherein the wireless device determines the congestion level corresponding to an amount of sidelink messages received by the wireless device (e.g., at least the reception component 1230). The apparatus 1202 may further include means for transmitting a radar signal, wherein the wireless device determines the congestion level based on a return signal from one or more reflections of the radar signal (e.g., at least the transmission component 1234). The apparatus 1202 may further include means for receiving a message indicating the congestion level, wherein the wireless device determines the congestion level from the message (e.g., at least the reception component 1230).

In another configuration, the apparatus 1202, and in particular the RF baseband processor 1204, includes means for detecting a congestion level of a wireless communication environment that includes the wireless device, the wireless device having at least one of a first FOV or a first range within the wireless communication environment; and means for transmitting, based on the congestion level exceeding a threshold, a radar signal that correspond to the wireless device having at least one of a second FOV or a second range within the wireless communication environment that is smaller than the at least one of the first FOV or the first range. The apparatus 1202 may further include means for adjusting one or more parameters of the radar signal to transmit the radar signal that corresponds to the wireless device having the at least one of the second FOV or the second range, the at least one of the second FOV or the second range being smaller than the at least one of the first FOV or the first range; and means for receiving a reflection of the radar signal based on the one or more parameters. The apparatus 1202 may further include means for receiving one or more sidelink messages from one or more sidelink devices, wherein the wireless device detects the congestion level based on an amount of sidelink messages received by the wireless device. The apparatus 1202 may further include means for measuring the congestion level based on one or more other radar signals received by the wireless device that do not correspond to the radar signal transmitted by the wireless device, wherein the wireless device detects the congestion level based on measuring the one or more other radar signals. The apparatus 1202 may further include means for receiving a message that indicates, to the wireless device, the congestion level of the wireless communication environment, wherein the wireless device detects the congestion level based on the message.

In another configuration, the apparatus 1202, and in particular the RF baseband processor 1204, includes means for measuring a congestion level of a wireless communication environment that includes a first wireless device, the first wireless device having at least one of a first FOV or a first range within the wireless communication environment; and means for transmitting a message to the first wireless device based on the congestion level, the message associated with the first wireless device having at least one of a second FOV or a second range in the wireless communication environment that is smaller than the at least one of the first FOV or the first range.

The aforementioned means may be one or more of the aforementioned components of the apparatus 1202 configured to perform the functions recited by the aforementioned means. As described supra, the apparatus 1202 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other examples or teachings described herein, without limitation.

The following aspects are illustrative only and may be combined with other aspects or teachings described herein, without limitation.

Aspect 1 is a method of wireless communication at a wireless device, including: detecting a congestion level of a wireless communication environment that includes the wireless device, the wireless device having at least one of a first field of view (FOV) or a first range within the wireless communication environment; and transmitting, based on the congestion level exceeding a threshold, a radar signal that corresponds to the wireless device having at least one of a second FOV or a second range within the wireless communication environment, the at least one of the second FOV or the second range being smaller than the at least one of the first FOV or the first range.

Aspect 2 may be combined with aspect 1 and further includes performing an adjustment of one or more parameters associated with the radar signal to transmit the radar signal that corresponds to the wireless device having the at least one of the second FOV or the second range that is smaller than the at least one of the first FOV or the first range.

Aspect 3 may be combined with any of aspects 1-2 and further includes receiving a reflection of the radar signal based on the one or more parameters.

Aspect 4 may be combined with any of aspects 1-3 and includes decreasing a sweeping up time ($T_{up}$) of the radar signal based on the one or more parameters.

Aspect 5 may be combined with any of aspects 1-4 and includes decreasing a transmit power ($P_{tx}$) of the radar signal transmitted by the wireless device.

Aspect 6 may be combined with any of aspects 1-5 and includes that the $P_{tx}$ corresponds to a decreased path loss of the radar signal.

Aspect 7 may be combined with any of aspects 1-6 and includes that the at least one of the second FOV or the second range that is smaller than the at least one of the first FOV or the first range corresponds to at least one of a first decrease in interference associated with the transmitted radar signal or a second decrease in interference associated with the received reflection of the radar signal.

Aspect 8 may be combined with any of aspects 1-7 and includes increasing a DTX time between chirps of the wireless device.

Aspect 9 may be combined with any of aspects 1-8 and includes decreasing the at least one of the first FOV or the first range to the at least one of the second FOV or the second range.

Aspect 10 may be combined with any of aspects 1-9 and further includes receiving one or more sidelink messages from one or more sidelink devices, wherein the detecting the congestion level being based on an amount of sidelink messages received by the wireless device.

Aspect 11 may be combined with any of aspects 1-10 and includes that the wireless device detects the congestion level based on an amount of sidelink messages received by the wireless device.

Aspect 12 may be combined with any of aspects 1-11 and further includes measuring the congestion level based on one or more other received radar signals that do not correspond to the transmitted radar signal transmitted by the wireless device.

Aspect 13 may be combined with any of aspects 1-12 and includes that the wireless device detects the congestion level based on measuring the one or more other radar signals.

Aspect 14 may be combined with any of aspects 1-13 and further includes receiving a message that indicates the congestion level of the wireless communication environment, the detecting the congestion level being based on the message.

Aspect 15 may be combined with any of aspects 1-14 and includes that the wireless device detects the congestion level based on the message.

Aspect 16 may be combined with any of aspects 1-15 and includes that the message is received from at least one of a base station or a sidelink device.

Aspect 17 may be combined with any of aspects 1-16 and includes that the wireless device is a vehicular radar or a non-vehicular radar.

Aspect 18 may be combined with any of aspects 1-17 and further includes performing the method based on at least one of an antenna or a transceiver.

Aspect 19 is a method of wireless communication at a second wireless device, including: measuring a congestion level of a wireless communication environment that includes a first wireless device, the first wireless device having at least one of a first FOV or a first range within the wireless communication environment; and transmitting a message to the first wireless device based on the congestion level, the message associated with the first wireless device having at least one of a second FOV or a second range in the wireless communication environment that is smaller than the at least one of the first FOV or the first range.

Aspect 20 may be combined with aspect 19 and includes that the message includes one or more parameters to decrease the at least one of the first FOV or the first range to the at least one of the second FOV or the second range.

Aspect 21 may be combined with any of aspects 19-20 and further includes performing the method based on at least one of an antenna or a transceiver.

Aspect 22 is an apparatus for wireless communication including memory and an at least one processor, the memory and the at least one processor configured to perform the method of any of aspects 1-18.

In aspect 23, the apparatus of aspect 22 further includes at least one antenna and a transceiver coupled to the at least one antenna and the at least one processor.

Aspect 24 is an apparatus for wireless communication including means for performing the method of any of aspects 1-18.

In aspect 25, the apparatus of aspect 24 further includes at least one antenna and a transceiver coupled to the at least one antenna.

Aspect 26 is a non-transitory computer-readable storage medium storing computer executable code, the code when executed by at least one processor causes the at least one processor to perform the method of any of aspects 1-18.

Aspect 27 is an apparatus for wireless communication including memory and an at least one processor, the memory and the at least one processor configured to perform the method of any of aspects 19-21.

In aspect 28, the apparatus of aspect 27 further includes at least one antenna and a transceiver coupled to the at least one antenna and the at least one processor.

Aspect 29 is an apparatus for wireless communication including means for performing the method of any of aspects 19-21.

In aspect 30, the apparatus of aspect 29 further includes at least one antenna and a transceiver coupled to the at least one antenna.

Aspect 31 is a non-transitory computer-readable storage medium storing computer executable code, the code when executed by at least one processor causes the at least one processor to perform the method of any of aspects 19-21.

What is claimed is:

1. An apparatus for wireless communication at a wireless device, comprising:
   memory; and
   one or more processors coupled to the memory and configured to cause the wireless device to:
     transmit, for a first radar signal sensing that has a first range, a first radar signal that has a first chirp time and a first sweeping up time, wherein the first range is based on the first chirp time and the first sweeping up time;
     measure wireless signals of a wireless communication environment, wherein the wireless communication environment includes the wireless device;
     detect, based on the measured wireless signals, that a congestion level associated with the wireless communication environment exceeds a threshold congestion level;
     decrease, based on the detected congestion level that exceeds the threshold congestion level, one or more parameters for a second radar signal sensing, wherein the one or more decreased parameters comprise at least a second sweeping up time that is shorter than the first sweeping up time and a second range that is smaller than the first range; and
     transmit, for the second radar signal sensing, a second radar signal that has the first chirp time and the second sweeping up time.

2. The apparatus of claim 1, wherein the one or more processors are further configured to cause the wireless device to:
receive a reflection of the second radar signal that has the first chirp time and the second sweeping up time.

3. The apparatus of claim 2, wherein the one or more decreased parameters comprise a transmit power ($P_{tx}$) associated with the second radar signal sensing.

4. The apparatus of claim 3, wherein the decreased $P_{tx}$ corresponds to a decreased path loss associated with the second radar signal sensing.

5. The apparatus of claim 2, wherein the second range that is smaller than the first range corresponds to at least one of a first decrease in first interference associated with the second radar signal sensing or a second decrease in second interference associated with the received reflection of the second radar signal.

6. The apparatus of claim 5, wherein the one or more decreased parameters comprises a pulse duration of the second radar signal that is associated with the second sweeping up time, wherein a discontinuous transmission (DTX) time between pulses associated with the second radar signal sensing is increased based on the pulse duration.

7. The apparatus of claim 1, wherein the one or more processors are further configured to cause the wireless device to:
receive one or more sidelink messages from one or more sidelink devices, wherein the measured wireless signals of the wireless communication environment comprise the one or more sidelink messages, and wherein, to detect that the congestion level associated with the wireless communication environment exceeds the threshold congestion level, the one or more processors are configured to cause the wireless device to detect the congestion level based on an amount of the one or more sidelink messages received from the one or more sidelink devices.

8. The apparatus of claim 1, wherein the measured wireless signals of the wireless communication environment comprise one or more other received radar signals that do not correspond to the transmitted first radar signal.

9. The apparatus of claim 1, wherein the one or more processors are further configured to cause the wireless device to:
receive a message that indicates the congestion level associated with the wireless communication environment, and wherein, to detect that the congestion level associated with the wireless communication environment exceeds the threshold congestion level, the one or more processors are configured to cause the wireless device to detect the congestion level based on the message.

10. The apparatus of claim 9, wherein the message is from at least one of a network node or a sidelink device.

11. The apparatus of claim 1, wherein the wireless device is a vehicular radar or a non-vehicular radar, the apparatus further comprising:
at least one antenna; and
a transceiver coupled to the at least one antenna and the one or more processors.

12. The apparatus of claim 1, wherein to detect that the congestion level exceeds the threshold congestion level, the one or more processors are configured to cause the wireless device to detect the congestion level based on one or more of:
a portion of a received power of the wireless signals that is not associated with a return signal of the first radar signal sensing,
a false peak associated with a radar image based on the first radar signal sensing, or
an increased noise floor on a range spectrum associated with the radar image.

13. An apparatus for wireless communication at a second wireless device, comprising:
memory; and
one or more processors coupled to the memory and configured to cause the second wireless device to:
measure wireless signals of a wireless communication environment, wherein the wireless communication environment includes a first radar signal of a first wireless device, wherein the first radar signal is associated with a first chirp time and a first sweeping up time, wherein the first radar signal is associated with a first radar signal sensing that has a first range, and wherein the first range is based on the first chirp time and the first sweeping up time;
detect, based on the measured wireless signals, that a congestion level of the wireless communication environment exceeds a threshold congestion level; and
transmit, based on the detected congestion level that exceeds the threshold congestion level, a message to the first wireless device to decrease one or more parameters for a second radar signal sensing, the one or more parameters comprising at least a second sweeping up time that is shorter than the first sweeping up time and a second range that is smaller than the first range.

14. The apparatus of claim 13, wherein the message includes the one or more parameters.

15. A method of wireless communication at a wireless device, comprising:
transmitting, for a first radar signal sensing that has a first range, a first radar signal that has a first chirp time and a first sweeping up time, wherein the first range is based on the first chirp time and the first sweeping up time;
measuring wireless signals of a wireless communication environment, wherein the wireless communication environment includes the wireless device;
detecting, based on the measured wireless signals, that a congestion level associated with the wireless communication environment exceeds a threshold congestion level;
decreasing, based on the detected congestion level that exceeds the threshold congestion level, one or more parameters for a second radar signal sensing, wherein the one or more decreased parameters comprise at least a second sweeping up time that is shorter than the first sweeping up time and a second range that is smaller than the first range; and
transmitting, for the second radar signal sensing, a second radar signal that has the first chirp time and the second sweeping up time.

16. The method of claim 15, further comprising:
receiving a reflection of the second radar signal that has the first chirp time and the second sweeping up time.

17. The method of claim 16, wherein the one or more parameters comprise a transmit power ($P_{tx}$) of the second radar signal sensing.

18. The method of claim 17, wherein the $P_{tx}$ corresponds to a decreased path loss of the second radar signal sensing.

19. The method of claim 16, wherein the second range corresponds to at least one of a first decrease in first interference associated with the second radar signal sensing or a second decrease in second interference associated with the received reflection of the second radar signal.

20. The method of claim 19, wherein the one or more decreased parameters comprises a pulse duration of the second radar signal that is associated with the second sweeping up time, wherein a discontinuous transmission (DTX) time between pulses associated with the second radar signal sensing is increased based on the pulse duration.

21. The method of claim 15, further comprising receiving one or more sidelink messages from one or more sidelink devices, wherein the measured wireless signals of the wireless communication environment comprise the one or more sidelink messages, and wherein, the detecting that the congestion level associated with the wireless communication environment exceeds the threshold congestion level is based on an amount of sidelink messages received by the wireless device.

22. The method of claim 15, wherein the wireless signals of the wireless communication environment comprise one or more other received radar signals that do not correspond to the transmitted first radar signal.

23. The method of claim 15, further comprising receiving a message that indicates the congestion level of the wireless communication environment, wherein the detecting that the congestion level associated with the wireless communication environment exceeds the threshold congestion level is based on the message.

24. The method of claim 23, wherein the message is from at least one of a network node or a sidelink device.

25. The method of claim 15, wherein the wireless device is a vehicular radar or a non-vehicular radar.

26. A method of wireless communication at a second wireless device, comprising:
measuring wireless signals of a wireless communication environment, wherein the wireless communication environment includes a first radar signal of a first wireless device that has a first chirp time and a first sweeping up time, wherein the first radar signal is associated with a first radar signal sensing that has a first range, and wherein the first range is based on the first chirp time and the first sweeping up time;
detecting, based on the measured wireless signals, that a congestion level of the wireless communication environment exceeds a threshold congestion level; and
transmitting, based on the detected congestion level that exceeds the threshold congestion level, a message to the first wireless device to decrease one or more parameters for a second radar signal sensing, the one or more parameters comprising at least a second sweeping up time that is shorter than the first sweeping up time and a second range that is smaller than the first range.

27. The method of claim 26, wherein the message includes the one or more parameters relating to the decrease of the first range to the second range.

28. A non-transitory computer-readable medium storing computer executable code at a wireless device, the code when executed by at least one processor causes the wireless device to:
transmit, for a first radar signal sensing that has a first range, a first radar signal that has a first chirp time and a first sweeping up time, wherein the first range is based on the first chirp time and the first sweeping up time;
measure wireless signals of a wireless communication environment, wherein the wireless communication environment includes the wireless device;
detect, based on the measured wireless signals, that a congestion level associated with the wireless communication environment exceeds a threshold congestion level;
decrease, based on the detected congestion level that exceeds the threshold congestion level, one or more parameters for a second radar signal sensing, wherein the one or more decreased parameters comprise at least a second sweeping up time that is shorter than the first sweeping up time and a second range that is smaller than the first range; and
transmit, for the second radar signal sensing, a second radar signal that has the first chirp time and the second sweeping up time.

29. A non-transitory computer-readable medium storing computer executable code at a second wireless device, the code when executed by at least one processor causes the second wireless device to:
measure wireless signals of a wireless communication environment, wherein the wireless communication environment includes a first radar signal of a first wireless device that has a first chirp time and a first sweeping up time, wherein the first radar signal is associated with a first radar signal sensing that has a first range, wherein the first range is based on the first chirp time and the first sweeping up time;
detect, based on the measured wireless signals, that a congestion level of the wireless communication environment exceeds a threshold congestion level; and
transmit, based on the detected congestion level that exceeds the threshold congestion level, a message to the first wireless device to decrease one or more parameters for a second radar signal sensing, the one or more parameters comprising at least a second sweeping up time that is shorter than the first sweeping up time and a second range that is smaller than the first range.

* * * * *